(12) United States Patent
Honda

(10) Patent No.: US 9,219,868 B2
(45) Date of Patent: Dec. 22, 2015

(54) IMAGE PROCESSING DEVICE, IMAGE PROCESSING METHOD, AND PROGRAM

(71) Applicant: Sony Corporation, Minato-ku (JP)

(72) Inventor: Yutaro Honda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/261,631

(22) Filed: Apr. 25, 2014

(65) Prior Publication Data
US 2014/0354883 A1 Dec. 4, 2014

(30) Foreign Application Priority Data
May 28, 2013 (JP) ................................. 2013-111689

(51) Int. Cl.
 *H04N 5/235* (2006.01)
(52) U.S. Cl.
 CPC .................................. *H04N 5/2357* (2013.01)
(58) Field of Classification Search
 CPC ............................ H04N 5/2357; H04N 7/012
 USPC ............................. 348/226.1, 222.1, 447, 448
 See application file for complete search history.

(56) References Cited

U.S. PATENT DOCUMENTS

| 2004/0119887 A1* | 6/2004 | Franzen | 348/459 |
| 2010/0045819 A1* | 2/2010 | Pillman et al. | 348/226.1 |
| 2012/0057046 A1* | 3/2012 | Tanaka | 348/229.1 |

FOREIGN PATENT DOCUMENTS

| JP | 3-138616 | 6/1991 |
| JP | 5-130551 | 5/1993 |
| JP | 7-306397 | 11/1995 |
| JP | 2003-280606 | 10/2003 |
| JP | 2003-302947 | 10/2003 |
| JP | 2009-216900 | 9/2009 |

* cited by examiner

*Primary Examiner* — Tuan Ho
(74) *Attorney, Agent, or Firm* — Oblon, McClelland, Maier & Neustadt, L.L.P.

(57) ABSTRACT

An image processing method executed in an image processing device, the image processing method including a to-be-updated pixel selection unit deciding, in response to a cyclic period serving as a frame period of a bright and dark stripe pattern of image frames configuring a moving image content, a group division form of constituent pixels of the image frames, dividing the constituent pixels of the image frames into a plurality of groups in accordance with the decided group division form, and generating, from each of the image frames, to-be-updated pixel information setting pixels of a specific group as to-be-updated pixels, and an output control signal generation unit selectively outputting, in accordance with the to-be-updated pixel information, to-be-updated pixels belonging to a specific group from each of the image frames, and generating an output control signal for causing pixels of a display image to be updated in units of groups.

13 Claims, 10 Drawing Sheets

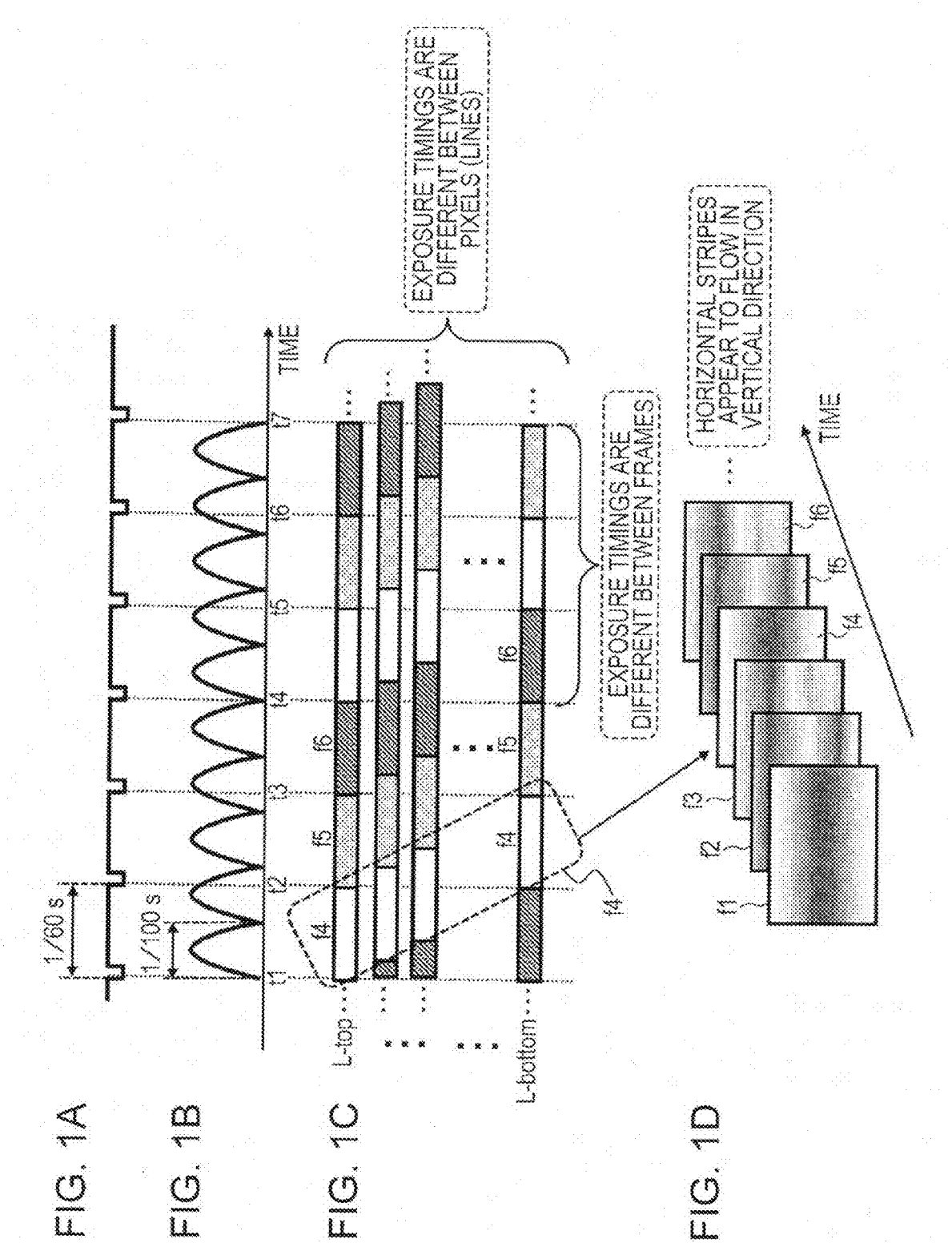

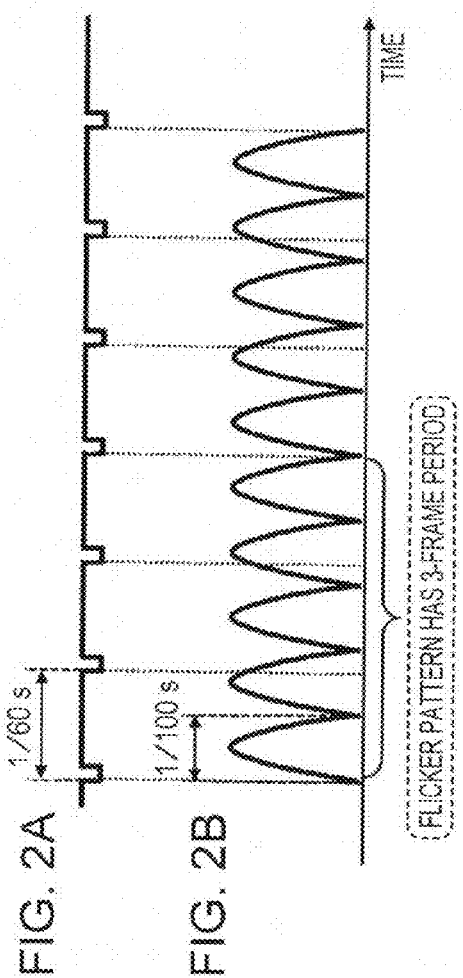
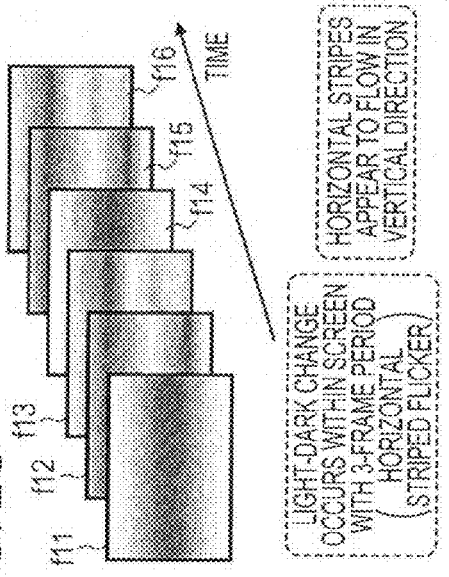
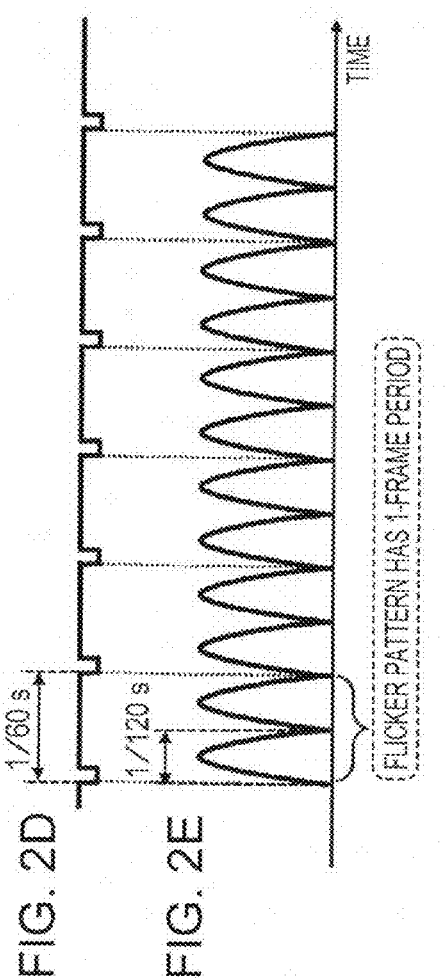
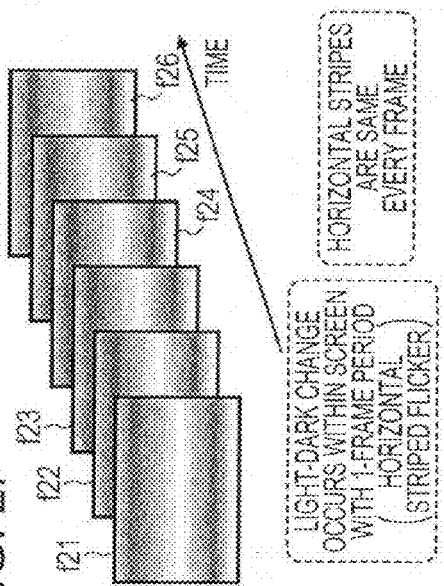

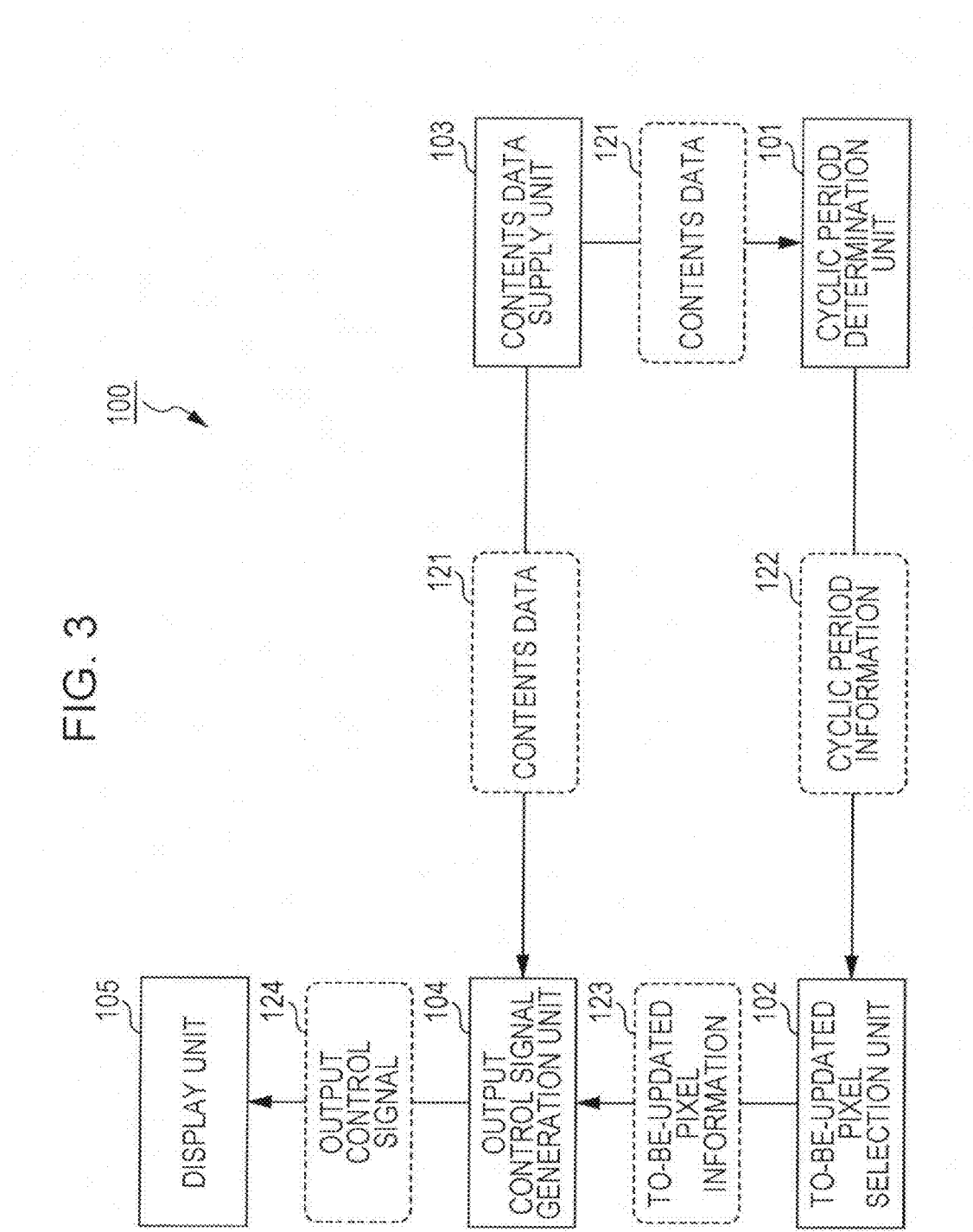

IMAGE PROCESSING DEVICE, IMAGE PROCESSING METHOD, AND PROGRAM

CROSS REFERENCE TO RELATED APPLICATIONS

This application claims the benefit of Japanese Priority Patent Application JP 2013-111689 filed May 28, 2013, the entire contents of which are incorporated herein by reference.

BACKGROUND

The present disclosure relates to an image processing device, an image processing method, and a program. More specifically, the present disclosure relates to an image processing device, an image processing method, and a program, each of which reduces a flicker occurring in an image, such as bright and dark stripes.

If, using an imaging element (image sensor) whose exposure timing is different based on pixel positions of the imaging element, image capturing is performed under a light source where a rapid light-dark change occurs in the brightness thereof with a lapse of time, a bright and dark striped noise is recorded in an image. In a case of capturing a moving image including successive image frames, bright and dark stripes are generated at different positions of individual image frames, and when the captured moving image is displayed on a display, horizontal stripes flowing in an up-down direction are observed.

As an example of the light source where a light-dark change occurs, a fluorescent light turned on by an alternating-current power supply is cited. A commercial power supply is 50 Hz in the eastern Japan, a commercial power supply is 60 Hz in the western Japan, and the fluorescent light repeats blinking in accordance with a change in the power-supply voltage.

If, under the illumination of such a fluorescent light, an image is captured by a camera equipped with an XY address scanning type imaging element such as, for example, a complementary metal oxides semiconductor (CMOS) imaging element, striped luminance unevenness or color unevenness is generated in an image signal.

In addition, the XY address scanning type imaging element is an element where exposure processing is sequentially performed so as to be headed from an upper row to a lower row in an image frame or from the lower row to the upper row therein. If image capturing utilizing such an imaging element is performed, bright and dark stripes corresponding to the amounts of incident light from illumination at individual exposure timings appear because the exposure timing is different in each of rows ranging from the upper row to the lower row in one image frame.

If a video (moving image) is image-captured under a lighting environment blinking with a predetermined frequency and the image-captured video is displayed on a display device, a phenomenon where a stripe pattern including a portion whose luminance is high and a portion whose luminance is low flows on a screen is confirmed. The reason is that the appearance positions of bright and dark stripes corresponding to the amounts of incident light from illumination are displaced between individual image frames configuring the moving image.

In this way, the bright and dark stripes of an image, generated based on a change in the amount of light of illumination at the time of image capturing is called a so-called "flicker".

In addition, the "flicker" means the overall flickering of a screen, generated at the time of displaying an image on a display. The above-mentioned bright and dark stripes emerging in an image are an example of the flicker. The bright and dark stripes appearing in a captured image are generated in various patterns based on a correspondence relationship between a lighting environment at the time of image capturing and the image-capturing frame rate of a captured image.

In other words, that a fluorescent light connected to a commercial power supply (alternating-current) basically repeats blinking with a cycle twice as large as a power-supply frequency and the operating principle of the imaging element cause the generation of the flicker.

As a technique of the related art disclosing processing for avoiding or reducing such a flicker, there is, for example, the following document.

Japanese Unexamined Patent Application Publication No. 5-130551 discloses a method for utilizing the periodicity of the light and darkness of a flicker generated in a moving image and reducing the flicker by averaging and recording the pixel values of a plurality of successive frames so as to cancel out a bright and dark component.

However, in order to execute this processing, it is necessary to perform an arithmetic operation for averaging a plurality of pixel values situated in corresponding positions of a plurality of image frames, and it becomes necessary to add a signal processing circuit for this arithmetic processing. In addition, other correction processing is available that, for example, detects bright and dark stripes being generated in one image frame without applying a plurality of image frames, performs pixel value correction based on a detection result, and removes a flicker. However, in a case of performing this processing, a signal processing circuit for performing the pixel value correction becomes necessary after all.

In addition, as techniques of the related art disclosing reduction processing for flickers occurring from blinking of a light source used for displaying in a display device, blinking of a light source to which the display device itself is subjected in a viewing environment, rewriting drive processing of the display device, and so forth, there are the following documents.

There are Japanese Unexamined Patent Application Publication No. 2003-280606, Japanese Unexamined Patent Application Publication No. 2003-302947, Japanese Unexamined Patent Application Publication No. 3-138616, Japanese Unexamined Patent Application Publication No. 2009-216900, Japanese Unexamined Patent Application Publication No. 7-306397, and so forth.

Any one of processing operations described in these documents discloses reduction of a flicker caused by a lighting environment or the like at an execution timing of image display processing to be performed on a display device. None of these documents discloses processing for reducing a flicker component included in a display content itself, in other words, bright and dark stripes included in the content itself owing to a lighting environment at the time of image capturing.

SUMMARY

It is desirable to provide an image processing device, an image processing method, and a program, each of which reduces a flicker generated due to a bright and dark component included, based on a lighting environment or the like at the time of image capturing, in a captured image itself.

An image processing device according to an embodiment of the present disclosure includes a to-be-updated pixel selection unit configured to execute processing for deciding, in response to a cyclic period serving as a frame period of a bright and dark stripe pattern of image frames configuring a moving image content, a group division form of constituent pixels of the image frames and dividing the constituent pixels of the image frames into a plurality of groups in accordance with the decided group division form, and generate, from each of the image frames, to-be-updated pixel information setting pixels of a specific group as to-be-updated pixels, and an output control signal generation unit configured to selectively output, in accordance with the to-be-updated pixel information, to-be-updated pixels belonging to a specific group from each of the image frames and generate an output control signal for causing pixels of a display image to be updated in units of groups.

Furthermore, in an embodiment of an image processing device according to the present disclosure, the image processing device further includes a cyclic period determination unit configured to determine the cyclic period of the moving image content and generate cyclic period information serving as a determination result, wherein the to-be-updated pixel selection unit applies the cyclic period information and decides the group division form.

Furthermore, in an embodiment of an image processing device according to the present disclosure, the image processing device further includes a display unit configured to input the output control signal from the output control signal generation unit and update, in accordance with the input output control signal, constituent pixels of the display image in units of groups.

Furthermore, in an embodiment of an image processing device according to the present disclosure, in group division processing for the constituent pixels of the image frames, the to-be-updated pixel selection unit executes group division processing set to the number of groups of the integral multiple of the cyclic period.

Furthermore, in an embodiment of an image processing device according to the present disclosure, the to-be-updated pixel selection unit executes group division processing for the constituent pixels of the image frames by applying group division information stored in a memory.

Furthermore, in an embodiment of an image processing device according to the present disclosure, in a case of the number of set groups=n, the to-be-updated pixel selection unit executes group division processing for repeatedly setting constituent rows of the image frames to groups 1 to n by one row, and generates the to-be-updated pixel information where specific group pixels divided from each image frame in units of rows are set as to-be-updated pixels, and the output control signal generation unit selectively outputs row-group-based to-be-updated pixels belonging to the specific group from each of the image frames, and generates the output control signal for causing the pixels of the display image to be updated in units of row groups.

Furthermore, in an embodiment of an image processing device according to the present disclosure, the to-be-updated pixel selection unit executes group division processing for dividing the constituent pixels of the image frames into a plurality of groups in accordance with a random pattern, and generates the to-be-updated pixel information where specific group pixels divided from each image frame in accordance with the random pattern are set as to-be-updated pixels, and the output control signal generation unit selectively outputs to-be-updated pixels belonging to the specific group from each of the image frames, and generates the output control signal for causing the pixels of the display image to be updated in accordance with the random pattern.

Furthermore, in an embodiment of an image processing device according to the present disclosure, the to-be-updated pixel selection unit stores, in a memory, a plurality of pieces of group division information specifying group division forms, acquires, from the memory, group division information set to the number of groups of the integral multiple of the cyclic period, and executes group division processing in accordance with the acquired group division information.

Furthermore, an imaging device according to an embodiment of the present disclosure includes an imaging unit configured to image-capture a moving image content, a to-be-updated pixel selection unit configured to execute processing for inputting an image-captured moving image content from the imaging unit, deciding, in response to a cyclic period serving as a frame period of a bright and dark stripe pattern of image frames configuring the input moving image content, a group division form of constituent pixels of the image frames, and dividing the constituent pixels of the image frames into a plurality of groups in accordance with the decided group division form, and generate, from each of the image frames, to-be-updated pixel information setting pixels of a specific group as to-be-updated pixels, and an output control signal generation unit configured to selectively output, in accordance with the to-be-updated pixel information, to-be-updated pixels belonging to a specific group from each of the image frames and generate an output control signal for causing pixels of a display image to be updated in units of groups.

Furthermore, in an embodiment of an imaging device according to the present disclosure, the imaging device further includes a cyclic period determination unit configured to determine the cyclic period of the moving image content and generate cyclic period information serving as a determination result, wherein the to-be-updated pixel selection unit applies the cyclic period information and decides the group division form.

Furthermore, in an embodiment of an imaging device according to the present disclosure, the imaging device further includes a display unit configured to input the output control signal from the output control signal generation unit and update, in accordance with the input output control signal, constituent pixels of the display image in units of groups.

Furthermore, an image processing method according to an embodiment of the present disclosure is executed in an image processing device and includes a to-be-updated pixel selection unit deciding, in response to a cyclic period serving as a frame period of a bright and dark stripe pattern of image frames configuring a moving image content, a group division form of constituent pixels of the image frames, dividing the constituent pixels of the image frames into a plurality of groups in accordance with the decided group division form, and generating, from each of the image frames, to-be-updated pixel information setting pixels of a specific group as to-be-updated pixels, and an output control signal generation unit selectively outputting, in accordance with the to-be-updated pixel information, to-be-updated pixels belonging to a specific group from each of the image frames, and generating an output control signal for causing pixels of a display image to be updated in units of groups.

Furthermore, a program according to an embodiment of the present disclosure causes image processing to be executed in an image processing device and includes causing a to-be-updated pixel selection unit to execute processing for deciding, in response to a cyclic period serving as a frame period of a bright and dark stripe pattern of image frames configuring a moving image content, a group division form of constituent pixels of the image frames and dividing the constituent pixels of the image frames into a plurality of groups in accordance with the decided group division form, and to execute processing for generating, from each of the image frames, to-beupdated pixel information setting pixels of a specific group as to-be-updated pixels, and causing an output control signal generation unit to selectively output, in accordance with the to-be-updated pixel information, to-be-updated pixels belonging to a specific group from each of the image frames and generate an output control signal for causing pixels of a display image to be updated in units of groups.

In addition, the program of an embodiment of the present disclosure is, for example, a program provided to an information processing device or a computer system capable of executing various program codes, using, for example, a storage medium. By executing such a program in a program execution unit on the information processing device or the computer system, processing according to the program is realized.

Yet another object, feature, or advantage of an embodiment of the present disclosure will become clear through more detailed description based on the after-mentioned embodiments of the present disclosure or attached drawings. In addition, in the present specification, the term "system" refers to a configuration that logically aggregates a plurality of devices, and is not limited to a configuration where devices of individual configurations are located within the same chassis.

According to the configuration of an embodiment of the present disclosure, a device and a method that realize flicker reduction of an image are realized.

Specifically, in response to a cyclic period serving as the frame period of a bright and dark stripe pattern of image frames configuring a moving image content, constituent pixels of the image frames are divided into a plurality of groups. Furthermore, to-be-updated pixel information setting pixels of a specific group as to-be-updated pixels is generated from each image frame, to-be-updated pixels belonging to a specific group are selectively output from each of the image frames in accordance with the generated to-be-updated pixel information, and pixels of a display image are updated in units of groups.

Using these processing operations, it becomes possible to set the display image to an image where a plurality of images are combined in units of groups, and it becomes possible to display an image where a flicker such as bright and dark stripes is reduced without an arithmetic circuit or without performing arithmetic processing, the arithmetic circuit and the arithmetic processing executing averaging for pixel values.

In addition, advantages described in the present specification are just exemplifications and not limited, and an additional advantage may exist.

BRIEF DESCRIPTION OF THE DRAWINGS

FIGS. 1A to 1D are diagrams explaining a flicker generated in a captured image;

FIGS. 2A to 2F are diagrams explaining light source luminance changes at the time of image capturing and bright and dark stripes generated in captured images;

FIG. 3 is a diagram explaining an example of a configuration of an image processing device according to an embodiment of the present disclosure;

DETAILED DESCRIPTION OF EMBODIMENTS

Figure 4:
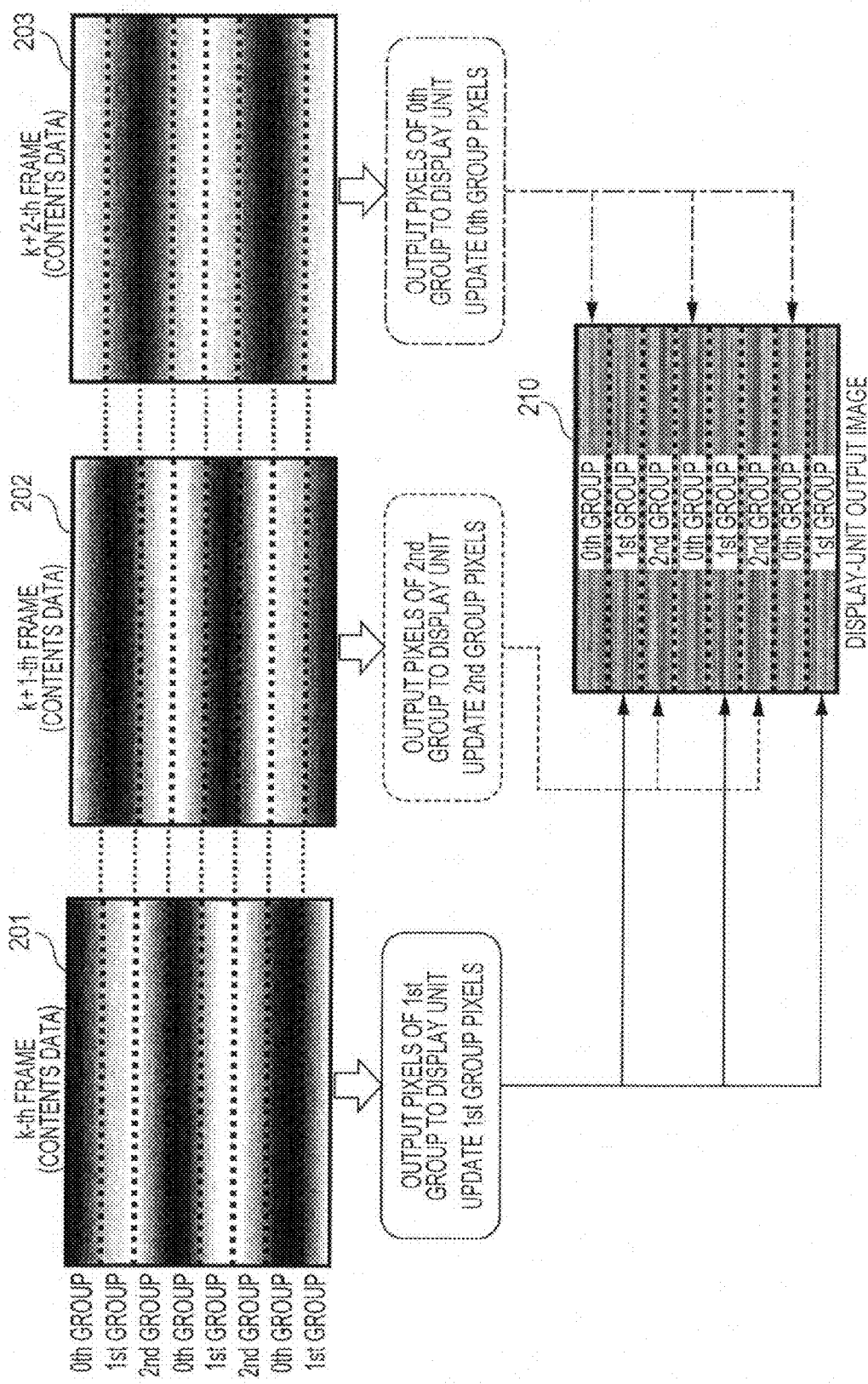
FIG. 4 is a diagram explaining an example of processing an output control signal generation unit executes.

Hereinafter, details of an image processing device, an image processing method, and a program of an embodiment of the present disclosure will be described with reference to drawings. Description will be performed in accordance with the following items:

1. About Generation Mechanism of Flicker,
2. About Configuration and Processing of Image Processing Device According to Embodiment of Present Disclosure,
3. About Specific Example of Pixel Update Processing Based on Group Division of Display Image,
4. Specific Examples of Group Division and Output Image Update Processing (First Embodiment),
5. About Other Embodiments,
5-1. Example Where Group Setting Is Set to Random Pattern (Second Embodiment),
5-2. Example Where Number of Groups Is Changed in Accordance with Cyclic Period of Flicker (Third Embodiment), and
6. Summary of Configuration of Embodiment of Present Disclosure.

1. About Generation Mechanism of Flicker

As described above, if, using an imaging element whose exposure timing is different based on pixel positions of the imaging element, an image is captured under a light source where a rapid light-dark change occurs in the brightness thereof with a lapse of time, a bright and dark striped noise is recorded in the image.

As an example of the light source where a light-dark change occurs, a fluorescent light turned on by an alternating-current power supply is cited. A commercial power supply is 50 Hz in the eastern Japan, a commercial power supply is 60 Hz in the western Japan, and the fluorescent light repeats blinking in accordance with a change in the power-supply voltage.

In addition, as an example of the imaging element whose exposure timing is different based on positions, a CMOS image sensor is cited. If an image is captured using an image-capturing device utilizing the CMOS image sensor, exposure is repeated sequentially so as to be headed from the top of the sensor to the bottom thereof or from the bottom to the top. Therefore, the timing of exposure is different based on the positions of pixels, such as the upper portion of the screen, the central portion thereof, and the lower portion thereof. Accordingly, the distortion of a rapidly moving subject, called a focal plane phenomenon, is generated, or alternatively, a bright and dark striped noise is image-captured in a screen horizontal direction under a blinking light source. A device according to an embodiment of the present disclosure reduces bright and dark stripes emerging in an image as a flicker phenomenon.

The generation mechanism of the flicker phenomenon will be described with reference to FIGS. 1A to 1D.

FIGS. 1A to 1D are diagrams explaining an example of the generation of the flicker phenomenon in moving image capturing processing for capturing an image having a frame rate=60 fps, in other words, 60 frames per second.

In FIGS. 1A to 1D, the following individual diagrams 1A to 1D are illustrated:

(FIG. 1A) a frequency signal of 60 Hz corresponding to an image-capturing frame rate of a moving image, (FIG. 1B) a change in luminance of a fluorescent light (a power-supply frequency of 50 Hz), and (FIG. 1C) an exposure timing of each pixel line in an imaging element capturing a moving image of 60 fps.

These are illustrated in accordance with a temporal axis (Time) proceeding from a left to a right.

Furthermore, results of individual frame images of a captured moving image are illustrated as (FIG. 1D) individual frames of the captured image.

(FIG. 1D) As illustrated in the individual frames of the captured image, a bright and dark horizontal stripe pattern, a so-called flicker pattern, is generated in the individual image frames.

This bright and dark stripe pattern is caused by the fact that an exposure timing is displaced with respect to each of horizontal pixel lines configuring an image frame. In other words, since the amount of light received from a light source is different in response to the displacement of the exposure timing of each pixel line, the bright and dark stripes are generated.

[The exposure timing of each pixel line in the imaging element capturing the moving image of 60 fps] illustrated in FIG. 1C is a diagram illustrating the exposure timing of each pixel line in each image frame.

A dotted-line rectangular frame illustrated within FIG. 1C illustrates the exposure timings of an uppermost pixel line (L-top) to a lowermost pixel line (L-bottom) of pixel lines configuring a frame 4 (f4) illustrated in FIG. 1D.

An example illustrated in the drawing is an example where exposure processing is sequentially performed so as to be headed from an upper row to a lower row.

The exposure time period of the uppermost pixel line (L-top) of the frame 4 (f4) is a time from t1 to t2. In addition, the exposure time period of the lowermost pixel line (L-bottom) is a time from t2 to t3.

In this way, the exposure timings of the individual pixel lines ranging from the uppermost pixel line (L-top) to the lowermost pixel line (L-bottom) of the pixel lines configuring the frame 4 (f4) are sequentially displaced between the time from t1 to t2 to the time from t2 to t3 with being headed from the upper line to the lower line.

During this time period from t1 to t3, the luminance change of the light source changes as illustrated in FIG. 1B, and a bright moment and a dark moment are alternately periodically repeated.

Accordingly, the amount of light received at the exposure timing of each of the pixel lines ranging from the uppermost pixel line (L-top) to the lowermost pixel line (L-bottom) of the pixel lines configuring the frame 4 (f4) is different in each pixel line. As a result, such a horizontal striped bright and dark pattern as illustrated in the frame f4 in FIG. 1D is generated.

The same applies to frames other than the frame f4.

Furthermore, among individual frames (f1, f2, f3, f4, f5, . . . ), the exposure timings of lines located at the same position in the individual image frames are different. Accordingly, bright and dark patterns in the individual image frames move in the vertical (longitudinal) direction of an image, and in a case where a moving image is displayed on a display device, it is observed that a bright and dark stripe pattern flows in the vertical direction.

This bright and dark stripes serving as the flicker phenomenon are different in the feature thereof, based on a relationship between a blinking frequency of a light source at the time of image capturing and a frame rate of a captured moving image.

A specific example will be described with reference to FIGS. 2A to 2F.

In FIGS. 2A to 2F, the following individual diagrams are illustrated:

(FIG. 2A) a frequency signal of 60 Hz corresponding to an image-capturing frame rate (60 fps) of a moving image, (FIG. 2B) a change in luminance of a light source (fluorescent light) (a power-supply frequency of 50 Hz), (FIG. 2C) a bright and dark pattern of a captured image frame (a light source of 50 Hz), (FIG. 2D) a frequency signal of 60 Hz corresponding to an image-capturing frame rate (60 fps) of a moving image, (FIG. 2E) a change in luminance of a light source (fluorescent light) (a power-supply frequency of 60 Hz), and (FIG. 2F) a bright and dark pattern of a captured image frame (a light source of 60 Hz).

FIGS. 2A to 2C correspond to an example of a case where the image-capturing frame rate is 60 fps and the power-supply frequency is 50 Hz.

In this case, an imaging period of each frame is $\frac{1}{60}$ sec. Since the brightness of the fluorescent light is only proportional to a voltage and not influenced by positive and negative signs of the voltage, a blinking frequency becomes twice the power-supply frequency and a period becomes $\frac{1}{100}$ sec.

In other words, FIGS. 2A to 2C are data corresponding to the following image-capturing conditions:

(1) a period of blinking of the light source=$\frac{1}{100}$ sec, and (2) a frame period of a captured image=$\frac{1}{60}$ sec.

Since these two periods in (1) and (2) do not coincide with each other, a stripe pattern where bright and dark lines are set at different positions in each frame is generated in an image-captured image frame.

Since the least common multiple of the above-mentioned two periods in the above-mentioned (1) and (2) is $\frac{1}{20}$ sec, bright and dark stripes are generated in the same position every $(\frac{1}{20})\div(\frac{1}{60})=3$ frames.

For example, bright and dark stripes set in a frame f11 illustrated in FIG. 2C and set in a frame f14 subsequent thereto by 3 frames are set at approximately the same positions in a vertical direction in individual images.

In the same way, bright and dark stripes set in a frame f12 illustrated in FIG. 2C and set in a frame f15 subsequent thereto by 3 frames are set at approximately the same positions in the vertical direction in individual images.

In the same way, bright and dark stripes set in a frame f13 illustrated in FIG. 2C and set in a frame f16 subsequent thereto by 3 frames are set at approximately the same positions in the vertical direction in individual images.

When viewed in units of image frames, it is assumed that the period of an image frame where bright and dark stripes are image-captured to be located at approximately the same positions is referred to as a cyclic period of a flicker.

The cyclic period of the image illustrated in FIG. 2C becomes 3 (frames).

On the other hand, FIGS. 2D to 2F correspond to an example of a case where the image-capturing frame rate is 60 fps and the power-supply frequency is 60 Hz.

In this case, the imaging period of each frame is 1/60 sec. The blinking frequency of the fluorescent light becomes twice the power-supply frequency and a period becomes 1/120 sec.

In other words, FIGS. 2D to 2F are data corresponding to the following image-capturing conditions:

(1) the period of blinking of the light source=1/120 sec, and
(2) the frame period of a captured image=1/60 sec.

These two periods in (1) and (2) are in a multiple relationship, and in a relationship of coinciding with each other as far as the periods go. Accordingly, a stripe pattern where bright and dark lines are set at the approximately the same positions in each frame is generated in an image-captured image frame.

Bright and dark stripes set in frames f21 to f26 illustrated in FIG. 2F are set at approximately the same positions in the vertical direction in individual images.

In this case, the cyclic period=1 is satisfied.

2. About Configuration and Processing of Image Processing Device According to Embodiment of Present Disclosure Next, the configuration and processing of an image processing device according to an embodiment of the present disclosure will be described with reference to FIG. 3 and drawings subsequent thereto.

Under a lighting environment where a periodic luminance change is generated, the image processing device according to an embodiment of the present disclosure executes processing for reducing bright and dark stripes, in other word, a flicker, which is generated in an image captured with a predetermined frame rate such as, for example, 60 fps.

Specifically, pixels of each image frame configuring an captured moving image are divided into groups in accordance with a predetermined rule, and output pixels (to-be-updated pixels) for a display unit are selected from each image frame configuring the moving image, in units of group pixels, and output to the display device. Using this processing, bright and dark stripes are reduced that serve as a flicker caused by a blinking light source in a moving image capturing environment and included in a moving image content.

In FIG. 3, an example of the configuration of the image processing device according to an embodiment of the present disclosure is illustrated.

As illustrated in FIG. 3, an image processing device 100 according to an embodiment of the present disclosure includes a cyclic period determination unit 101, a to-be-updated pixel selection unit 102, a contents data supply unit 103, an output control signal generation unit 104, and a display unit 105.

In addition, specifically, an imaging device capable of capturing, for example, a moving image, an information processing device such as PC, which reads out, from a storage unit, a moving image content image-captured by an imaging device and executes display processing, and so forth are cited as the image processing device 100.

Hereinafter, processing in each configuration unit in the image processing device 100 illustrated in FIG. 3 will be sequentially described.

The cyclic period determination unit 101 acquires the cyclic period of contents data 121 serving as a display target and being supplied from the contents data supply unit 103, and outputs acquired cyclic period information 122 to the to-be-updated pixel selection unit 102.

The cyclic period determination unit 101 determines the cyclic period described with reference to FIGS. 2A to 2F, in other words, a cyclic period serving as the period of an image frame where positions of bright and dark stripes generated in individual image frames configuring the moving image become approximately the same positions. The cyclic period determination unit 101 supplies, as the cyclic period information 122, a cyclic period of a determination result to the to-be-updated pixel selection unit 102.

For example, if the contents data 121 serving as the display target and being supplied from the contents data supply unit 103 is recorded moving image data, it is possible to judge the cyclic period by verifying the period of a bright and dark pattern of a moving-image constituent frame. In other words, an image frame in which bright and dark stripes having the same pattern appear is detected, and the frame period thereof is determined as the cyclic period.

In addition, in a case where the image processing device 100 is a camera and the contents data 121 serving as a display target and being supplied from the contents data supply unit 103 is an image being captured by the camera, a blinking state of a light source under an image-capturing environment may be directly observed and processing for judging the cyclic period may be performed based on a luminance change frequency of the light source and a frame period of the captured image.

In other words, as described with reference to FIGS. 2A to 2C, the cyclic period is judged based on, for example, the following pieces of information:

(1) the period of the blinking frequency of the light source=1/100 sec, and
(2) the frame period of the captured image=1/60 sec.

In the case of this setting, the least common multiple of the above-mentioned two periods is 1/20 sec.

A value by dividing the least common multiple (1/20) by the frame period (1/60) becomes the cyclic period. In other words,
(1/20)÷(1/60)=3 is satisfied, and
the cyclic period=3 frames is satisfied.

In addition, in a setting corresponding to FIGS. 2D to 2F, calculation processing for the cyclic period is performed based on the following pieces of information:

(1) the period of the blinking frequency of the light source=1/120 sec, and
(2) the frame period of the captured image=1/60 sec.

In the case of this setting, the least common multiple of the above-mentioned two periods is 1/60 sec.

A value by dividing the least common multiple (1/60) by the frame period (1/60) becomes the cyclic period. In other words,
(1/60)÷(1/60)=1 is satisfied, and
the cyclic period=1 frame is satisfied.

In addition, in a case of a configuration where the cyclic period determination unit 101 directly observes the blinking state of the light source under an image-capturing environment and judges the cyclic period based on the luminance change frequency of the light source and the frame period of the captured image, the cyclic period determination unit 101 adopts a configuration equipped with a photometric sensor for observing the blinking state of the light source under an image-capturing environment, or alternatively, a configuration where sensor detection information from the photometric sensor is input.

In addition, a configuration may be adopted where it is possible for the cyclic period determination unit 101 to acquire location information of a content at the time of image capturing, for example, a configuration may be adopted where the location information is acquirable from GPS information or attribute information or the like of a captured image, and a configuration may be adopted where the cyclic period is judged from the location information.

In other words, based on the location information at the time of capturing a moving image serving as contents data, the cyclic period determination unit 101 judges whether a spot in which image capturing has been performed is a region in which a power-supply frequency is 50 Hz or a region in which the power-supply frequency is 60 Hz, and the cyclic period determination unit 101 judges the cyclic period, based on judged power-supply frequency information and the frame rate of the captured image. In a case of adopting this configuration, the photometric sensor is not necessary.

In addition, in a case where, it is possible to preliminarily create a content in which the cyclic period is recorded as the attribute information of the captured image, a configuration where the cyclic period is directly acquired from the attribute information may be adopted.

In this way, various methods are applicable to a cyclic period acquisition method for a content in the cyclic period determination unit 101, and the image processing device according to an embodiment of the present disclosure is not limited to a device utilizing a specific cyclic period detector.

In addition, for example, in a case where the image processing device 100 performs processing independent of the cyclic period, in other words, in a case of adopting a configuration where after-mentioned pixel update is performed as fixed processing or alternatively, in a case where it is not necessary to check the cyclic period with respect to each content and change processing, such as a case where the image processing device 100 is a device only dealing with a content whose cyclic period is constant, a configuration where the cyclic period determination unit 101 is omitted may be adopted.

The to-be-updated pixel selection unit 102 inputs the cyclic period information 122 of the contents data 121 from the cyclic period determination unit 101.

Based on the input cyclic period information 122, the to-be-updated pixel selection unit 102 generates and outputs to-be-updated pixel information 123 to the output control signal generation unit 104.

The to-be-updated pixel selection unit 102 holds, in a memory, group division information of pixels.

The group division information is information indicating a division form for dividing constituent pixels of an image frame configuring a moving image serving as the contents data 121 into a plurality of groups.

For example, an example where the upper row to the lower row of an image frame are divided into a plurality of groups (groups 0, 1, 2, . . . ), an example where constituent pixels are randomly divided into a plurality of groups, and so forth are cited.

In addition, it is desirable that the number n of groups to be set is set to the integral multiple of the cyclic period and each group is set in such a pattern that pixels of each group are nearly evenly scattered all over a screen by a number obtained by dividing all the pixels of the image frame into "n" equal parts.

In addition, for example, a configuration is adopted where a plurality of pieces of group division information according to the cyclic period are stored in a memory accessible by the to-be-updated pixel selection unit 102.

Specifically, the following pieces of group division information are adopted:

(A) group division information including groups whose number is 3 or a multiple of 3 available for a content of the cyclic period=3, and (B) group division information including groups whose number is 5 or a multiple of 5 available for a content of the cyclic period=5.

For example, such pieces of group division information are adopted.

In this way, it is desirable that a configuration is adopted where a plurality of pieces of group division information having the numbers of divided groups of the integral multiples of cyclic periods according to various cyclic periods "n" are stored in the memory accessible by the to-be-updated pixel selection unit 102.

The to-be-updated pixel selection unit 102 acquires the cyclic period of the contents data 121 in accordance with the cyclic period information 122 input from the cyclic period determination unit 101, and acquires, in response to the acquired cyclic period, the group division information having a group division number that is equal to the cyclic period or the integral multiple thereof.

For example, in a case of a cyclic period number=3, the to-be-updated pixel selection unit 102 acquires, from the memory, the group division information having the group division number=3, and divides the constituent pixels of an image frame into 3 groups.

One specific example of the group division will be described.

For example, in a case where the upper row to the lower row of each image frame are divided into 3 groups (groups 0, 1, and 2), the following setting is available:

the 1st, 4th, 7th, . . . rows=the 0th group,
the 2nd, 5th, 8th, . . . rows=the 1st group, and
the 3rd, 6th, 9th, . . . rows=the 2nd group.

The to-be-updated pixel selection unit 102 performs, for example, group division of the above-mentioned setting.

In addition, as for the group division form, various settings such as a row-based setting and a setting of a random pattern are available. A specific example of the group setting will be described later.

The to-be-updated pixel selection unit 102 selects one piece of the group division information held in the memory, generates, in accordance with the selected group division information, pixel position information corresponding to a specific selection group to be output to the display unit 105 as to-be-updated pixels with respect to each image frame configuring the contents data 121, and outputs the pixel position information to the output control signal generation unit 104. In other words, as illustrated in FIG. 3, the to-be-updated pixel selection unit 102 generates and outputs the to-be-updated pixel information 123 to the output control signal generation unit 104.

For example, it is assumed that the constituent pixels of each of moving image frames (the frames f0, f1, f2, f3, f4, f5, . . . ) configuring the contents data 121 are divided into 3 groups as described above. In other words, the following group setting is adopted:

the 1st, 4th, 7th, . . . rows=the 0th group,
the 2nd, 5th, 8th, . . . rows=the 1st group, and
the 3rd, 6th, 9th, . . . rows=the 2nd group.

In such a setting, the to-be-updated pixel selection unit 102 sets the to-be-updated pixel information 123, for example, in the following way, and outputs the to-be-updated pixel information 123:

the frame 0 (f0): the to-be-updated pixels=pixels of the group 0,
the frame 1 (f1): the to-be-updated pixels=pixels of the group 1,
the frame 2 (f2): the to-be-updated pixels=pixels of the group 2, the frame 3 (f3): the to-be-updated pixels=pixels of the group 0,
the frame 4 (f4): the to-be-updated pixels=pixels of the group 1,
the frame 5 (f5): the to-be-updated pixels=pixels of the group 2, and so on.

The above-mentioned example of the setting of the to-be-updated pixels is an example where the constituent pixels of one image frame are divided into the 3 groups (the groups 0, 1, and 2) and individual pixels of the groups 0, 1, and 2 are repeatedly set as to-be-updated pixels in order with respect to individual successive image frames. As for the group setting or the setting of to-be-updated pixels, various settings are available. A specific example of processing will be described later.

The output control signal generation unit 104 inputs the to-be-updated pixel information 123 from the to-be-updated pixel selection unit 102, and inputs the contents data 121 from the contents data supply unit 103.

With respect to each of image frames of moving images configuring the contents data 121 input from the contents data supply unit 103, the output control signal generation unit 104 selects to-be-updated pixels in accordance with the to-be-updated pixel information 123 input from the to-be-updated pixel selection unit 102, and outputs the to-be-updated pixels to the display unit 105.

In other words, for example, in the above-mentioned case, an output control signal 124 where only pixels of the following selection groups are set to to-be-updated pixels is generated with respect to individual image frames and output to the display unit 105.

As for the frame 0 (f0), an output control signal where pixels of the group 0 are set to to-be-updated pixels is output.
As for the frame 1 (f1), an output control signal where pixels of the group 1 are set to to-be-updated pixels is output.
As for the frame 2 (f2), an output control signal where pixels of the group 2 are set to to-be-updated pixels is output.
As for the frame 3 (f3), an output control signal where pixels of the group 0 are set to to-be-updated pixels is output.
As for the frame 4 (f4), an output control signal where pixels of the group 1 are set to to-be-updated pixels is output.
As for the frame 5 (f5), an output control signal where pixels of the group 2 are set to to-be-updated pixels is output.

Thereafter, the above-mentioned processing is repeated in units of 3 frames.

In this way, the output control signal generation unit 104 generates and outputs the output control signal 124 for selecting only some pixels from the constituent pixels of successive image frames configuring a moving image content serving as the contents data 121 and sequentially displaying (updating) the selected pixels on the display unit 105.

In this way, the image processing device 100 according to an embodiment of the present disclosure executes display processing for a moving image according to the following procedure.

(S1) The cyclic period determination unit 101 judges the cyclic period of the contents data 121.

(S2) The to-be-updated pixel selection unit 102 divides, into groups, the constituent pixels of each image frame configuring the contents data 121 in accordance with the cyclic period information 122 and the group division information.

(S3) With respect to each image frame configuring the contents data 121, the to-be-updated pixel selection unit 102 decides a group to be set to to-be-updated pixels, and outputs, as the to-be-updated pixel information 123, the pixel position information corresponding to the decided specific group to the output control signal generation unit 104.

(S4) In accordance with the to-be-updated pixel information 123, the output control signal generation unit 104 generates, from each image frame, the output control signal 124 including pixel position information to be updated, and outputs the output control signal 124 to the display unit 105.

(S5) In accordance with the output control signal 124, the display unit 105 outputs and updates a display image.

In addition, the output and update processing for a display image, executed in the above-mentioned (S5), is executed as processing for sequentially updating, in units of groups, the constituent pixels of a display image for the display unit 105. Pixels included in other groups other than pixels included in an updated group are not updated, and pixel values displayed in the display unit 105 are maintained without change.

Information indicating pixels of which group are to be selected from which image frame is included in the to-be-updated pixel information 123. In addition, the processing will be described in detail in a subsequent stage.

The contents data supply unit 103 supplies the contents data 121 to be a display target in the display unit 105, in other words, each piece of image frame data configuring a moving image.

If the image processing device 100 is an imaging device such as, for example, a digital camera system, the contents data supply unit 103 is configured using an image sensor serving as an imaging unit. In addition, if the image processing device 100 is a reproduction device for recorded contents, the contents data supply unit 103 is configured using a storage mechanism storing therein contents data, for example, a storage such as a hard disk, a DVD, a BD, or a flash memory.

In this way, the image processing device 100 according to an embodiment of the present disclosure, illustrated in FIG. 3, performs processing for sequentially outputting, to the display unit 105 as pixels to be updated, pixels in only a pixel region included in a portion of groups, within the constituent pixels of each image frame configuring a moving image content serving as the contents data 121. Information indicating pixels of which group are to be selected as to-be-updated pixels with respect to each of image frames is included in the to-be-updated pixel information 123. From each image frame configuring the contents data 121 input from the contents data supply unit 103, the output control signal generation unit 104 selects to-be-updated pixels belonging to a specific group, in accordance with the to-be-updated pixel information 123, and generates and outputs, to the display unit 105, the output control signal 124 including to-be-updated pixel values of the specific group. Pixels belonging to groups not including the to-be-updated pixels are not updated, and are maintained without change while not changing output pixels of the display unit 105.

The display unit 105 executes image display in accordance with the output control signal 124 generated by the output control signal generation unit 104.

In other words, in accordance with the output control signal 124, processing for only updating pixels belonging to a specific group displayed in the display unit 105 is executed.

3. About Specific Example of Pixel Update Processing Based on Group Division of Display Image As described with reference to FIG. 3, in the image processing device 100 according to an embodiment of the present disclosure, the output control signal generation unit 104 executes, in units of groups, update processing for the constituent pixels of an image displayed on the display unit 105, in accordance with the to-be-updated pixel information 123 input from the to-be-updated pixel selection unit 102.

In other words, processing is performed where, within the constituent pixels of successive image frames configuring a moving image content serving as the contents data 121, the pixel values of only a pixel region included in a portion of groups are sequentially selected and output to the display unit 105.

One specific example of the processing of the output control signal generation unit 104 will be described with reference to FIG. 4.

FIG. 4 is a diagram explaining an example of the processing the output control signal generation unit 104 executes.

In FIG. 4, as successive image frames of a moving image serving as contents data the contents data supply unit 103 outputs, three successive frames of the k-th frame 201, the k+1-th frame 202, and the k+2-th frame 203 are illustrated.

Furthermore, a display-unit output image 210 is illustrated that serves as an image displayed on the display unit 105 in accordance with the output control signal 124 generated by the output control signal generation unit 104.

An image frame of a moving image serving as contents data input from the contents data supply unit 103 is divided into groups corresponding to pixel positions.

In the example illustrated in FIG. 4, an example of being divided into the following three groups is illustrated:
the 0th group,
the 1st group, and
the 2nd group.

The group setting illustrated in FIG. 4 is an example where each of pixel rows individually having widths of one to several lines in the vertical direction of each image frame is set as one group and the 0th group to the 2nd group are repeatedly set in the vertical direction of the image frame.

In addition, in accordance with the cyclic period information 122 input from the cyclic period determination unit 101, the to-be-updated pixel selection unit 102 executes this group division processing by selecting a predetermined piece of group division information from the group division information stored in the memory. The example illustrated in this FIG. 4 is an example of a case of the cyclic period=3 frames, and an example of a group setting utilizing the group setting information of the number of set groups=3.

The to-be-updated pixel selection unit 102 performs group division on the constituent pixels of each image frame configuring the contents data 121, in accordance with the cyclic period information 122 and the group division information.

Furthermore, the to-be-updated pixel selection unit 102 decides a group to be to-be-updated pixels with respect to each of image frames configuring the contents data 121, and outputs, as the to-be-updated pixel information 123, pixel position information corresponding to the decided specific group to the output control signal generation unit 104.

As for successive image frames configuring moving image data serving as the contents data 121, the output control signal generation unit 104 generates the output control signal 124 including pixel position information and pixel values, which are to be updated in accordance with the to-be-updated pixel information 123, and outputs the output control signal 124 to the display unit 105.

Furthermore, in accordance with the output control signal 124, the display unit 105 updates pixel values of pixels belonging to the specific group within a display image.

The display-unit output image 210 illustrated in FIG. 4 is an example of the configuration of an image displayed in accordance with the above-mentioned processing, and an image configured by to-be-updated pixels (output pixels) of the following setting:
pixels of the 1st group of the k-th frame 201,
pixels of the 2nd group of the k+1-th frame 202, and
pixels of the 0th group of the k+2-th frame 203.

An image configured by these to-be-updated pixels becomes an output image for the display unit 105, in other words, the display-unit output image 210 illustrated in FIG. 4.

In addition, after that, with respect to image frames in and after the k+3-th frame, input as the contents data 121, in the same way as the k-th to k+2-th frames, processing where only pixels of specific groups are selected from individual image frames and selectively output as to-be-updated pixels is repeated.

In other words, the following processing is sequentially executed.

The pixels of the 1st group are acquired from the image of the k+3-th frame input from the contents data supply unit 103 and output to the display unit 105, and the pixels of the 1st group within an image currently displayed on the display unit 105 are updated.

Next, the pixels of the 2nd group are acquired from the image of the k+4-th frame input from the contents data supply unit 103 and output to the display unit 105, and the pixels of the 2nd group within an image currently displayed on the display unit 105 are updated.

Furthermore, the pixels of the 0th group are acquired from the image of the k+5-th frame input from the contents data supply unit 103 and output to the display unit 105, and the pixels of the 0th group within an image currently displayed on the display unit 105 are updated.

Thereafter, with respect to inputs in and after the k+6-th frame, the same processing as the above-mentioned processing is executed.

In this way, from the three successive image frames configuring the contents data 121, the output control signal generation unit 104 generates the output control signal 124 for individually setting, as to-be-updated pixels, group pixels located in different pixel positions, in other words, the 0th group pixels to the 2nd group pixels, and the output control signal generation unit 104 outputs the output control signal 124 to the display unit 105. The display unit 105 performs processing for sequentially updating the constituent pixels of each group.

As a result, in the image of the display unit 105, the pixels of the 0th group to the 2nd group are sequentially updated in units of groups.

In addition, the group setting and the image output processing described with reference to FIG. 4 are examples, and various group settings and various image output processing operations are available.

In other words, as for the number of group settings in a case of performing group division, the number of pixels in one group, a patter for grouping, and a form for performing update processing for each image frame in units of groups, various settings are available. In addition, these processing operations are decided in accordance with the to-be-updated pixel information generated by the to-be-updated pixel selection unit 102, or the like.

In addition, since, depending on the setting form of groups, a difference occurs in a flicker reduction effect, it is desirable that, as the group setting form, a setting where a more highly flicker reduction effect is obtained is adopted. In addition, a setting may be adopted where the group setting form is changed during display of an image in accordance with the configuration or the like of the image.

It is desirable that the number n of set groups is set to the integral multiple of the cyclic period and the group setting is performed in such a pattern that pixels of each group is evenly scattered all over a screen by the number of pixels obtained by dividing all the pixels of an image frame into "n" equal parts. The reason is that, by adopting such a group setting, it becomes easy for a bright and dark component in an output image for a display unit to be smoothed and it becomes possible to enhance the flicker reduction effect.

However, the number of frames taken for rewriting of all pixels increases with an increase in the number n of set groups, and hence, residual images of a display content increase in number. Therefore, it is desirable that, in a case where the cyclic period is large, processing for balancing with an effect for reducing blinking is performed.

4. Specific Examples of Group Division and Output Image Update Processing

First Embodiment

First, as a first embodiment, an example of processing for a content (moving image) image-captured in the following setting will be described:

(1) an image-capturing frame rate of a content (moving image)=60 fps, and (2) a lighting environment at the time of image-capturing a content=a fluorescent light (a blinking frequency=100 Hz) connected to a power supply of 50 Hz.

This setting corresponds to the setting described with reference to FIGS. 2A to 2C.

In this setting, bright and dark stripes emerging in a captured image are generated in approximately the same positions with a 3-frame period. In other words, the cyclic period=3 is satisfied.

In the present first embodiment, it is assumed that the number n of set groups is 3 equal to the cyclic period. In other words, the number n of groups=3 is satisfied.

As for grouping for pixels in each image frame, an upper row line to a lower row line serving as the horizontal pixel lines of each image frame are repeatedly set as the 0th group, the 1st group, or the 2nd group every one row.

Figure 5:
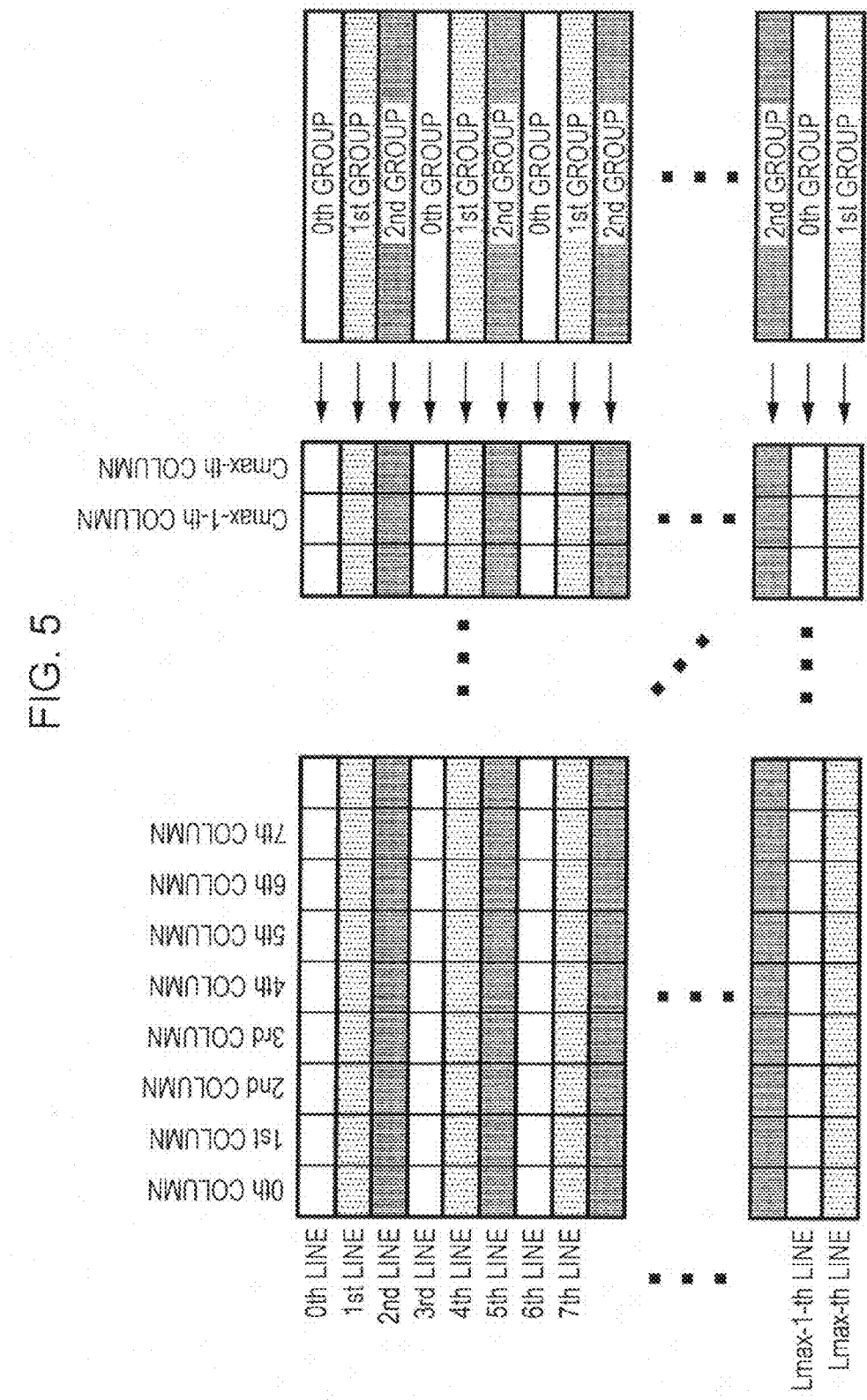
FIG. 5 is a diagram explaining an example of processing the output control signal generation unit executes.

As illustrated in FIG. 5, if an uppermost row is set as the 0th line and a lowermost row is set as the Lmax-th line, individual lines (the 0th line to the Lmax-th line) are divided into groups in the following way:

the 0th group: lines 0, 3, 6, 9, 12, . . . , the 1st group: lines 1, 4, 7, 10, 13, . . . , and the 2nd group: lines 2, 5, 8, 11, 14, . . . .

If being expressed by a mathematical expression utilizing line numbers (from 0) from the uppermost row, the grouping of the uppermost row (the 0th line) to the lowermost row (the Lmax-th line) may be described in the following way. In this regard, however, m=an integer number greater than or equal to 0 is satisfied:

the 3×m-th line=the 0th group, the 3×m+1-th line=the 1st group, and the 3×m+2-th line=the 2nd group.

Such group division is performed.

In accordance with the above-mentioned group setting, the to-be-updated pixel selection unit 102 decides a group to be set to to-be-updated pixels with respect to each image frame configuring a moving image serving as contents data, and generates and outputs, to the output control signal generation unit 104, to-be-updated pixel information including the pixel position information of to-be-updated pixels corresponding to the decided group. In addition, the to-be-updated pixel information is generated as information corresponding to each image frame.

With respect to each image frame configuring the contents data 121 supplied from the contents data supply unit 103, the output image generation unit 104 generates and outputs, to the display unit 124, the output control signal 124 including the pixel values of to-be-updated pixel positions selected in accordance with the to-be-updated pixel information 123.

The output control signal 124 is generated in units of individual image frames configuring the contents data 121 output from the contents data supply unit 103, and output to the display unit 105.

The output control signal 124 includes the pixel values of to-be-updated pixel positions included in a specific group selected from each image frame, and is a control signal used for executing processing for causing pixels located at these to-be-updated pixel positions to be replaced with new to-be-updated pixel values and causing pixel values in other regions to maintain, without change, pixel values currently displayed, within an image displayed on the display unit 105.

Specific processing the output control signal generation unit 104 executes will be described.

First, if, as the contents data 121 output from the contents data supply unit 103, the 0th frame of moving image data is input, the output control signal generation unit 104 selects and outputs, as to-be-updated pixels, the pixel values of the 0th group of the 0th frame to the display unit 105. In a case where there is an image already displayed on the display unit 105, only the pixels of the 0th group within the display image are updated.

In a case where there is no image displayed on the display unit 105, an image only including the pixels of the 0th group is displayed as an initial image.

Next, if, as the contents data 121, the 1st frame of the moving image data is input from the contents data supply unit 103, the output control signal generation unit 104 selects and outputs, as to-be-updated pixels, the pixel values of the 1st group of the 1st frame to the display unit 105. In a case where there is an image already displayed on the display unit 105, only the pixels of the 1st group within the display image are updated. In a case where an image of the pixels of the 0th group of the 0th frame is currently displayed as the initial image, the pixels of the 1st group of the 1st frame are added to the image and displayed.

Furthermore, if, as the contents data 121, the 2nd frame of the moving image data is input from the contents data supply unit 103, the output control signal generation unit 104 selects and outputs, as to-be-updated pixels, the pixel values of the 2nd group of the 2nd frame to the display unit 105. In a case where there is an image already displayed on the display unit 105, only the pixels of the 2nd group within the display image are updated. In a case where the pixels of the 0th group of the 0th frame are displayed and the pixels of the 1st group of the 1st frame are additionally displayed next as the initial image, furthermore the pixels of the 2nd group of the 2nd frame are additionally displayed.

In this way, from each of the three successive frames of the moving image data serving as the contents data 121 supplied from the contents data supply unit 103, the output control signal generation unit 104 sequentially selects only pixel data of a specific group, and outputs the selected group data to the display unit 105 as the output control signal 124.

According to this processing, the display unit 105 sequentially updates and displays pixels of three groups individually selected from the three successive image frames.

In a case where the contents data 121 supplied from the contents data supply unit 103 is, for example, a moving image of 60 fps having 60 frames per second, only the pixel values of pixel positions corresponding to one group are updated every (1/60) seconds in the display image of the display unit 105. In other words, in the present example, since the number of groups is 3, pixels of a region of one third of the display image are updated every (1/60) seconds. The entire image is updated in units of 3×(1/60)=(1/20) seconds.

In the present embodiment, while the image displayed on the display unit 105 is sequentially updated by a region of one third of the entire image, this update processing is rapidly executed. Therefore, a difference with usual moving image display updated in units of frames is not recognized by the human eye, and the image displayed on the display unit 105 is observable as the same image as general display of a moving image.

The image displayed on the display unit 105 by this processing becomes an image where bright and dark stripes serving as a flicker component are reduced.

Figure 6:
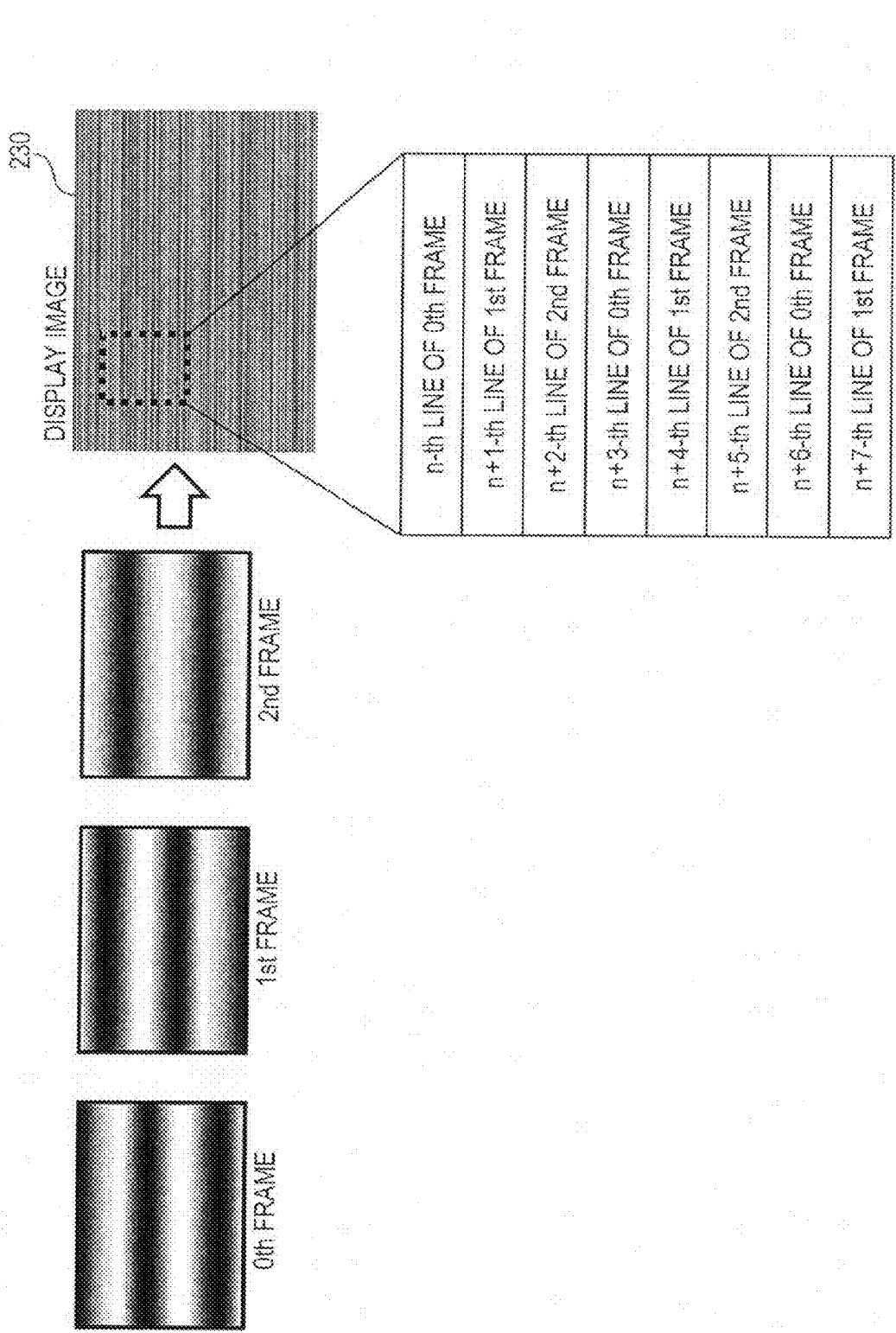
FIG. 6 is a diagram explaining processing the output control signal generation unit executes and an example of a configuration of an output image for a display unit.

FIG. 6 illustrates an image displayed on the display unit 105 by the above-mentioned processing, and three successive frames of a moving image including an original flicker component, in other words, examples of images of the 0th frame, the 1st frame, and the 2nd frame.

The images of the 0th to the 2nd frame are model diagrams of a moving image including a flicker component (bright and dark stripes) whose cyclic period is 3. In addition, if even white paper or the like is image-captured under a blinking light source, an image similar to the image that is illustrated in FIG. 6 and includes only the flicker component is captured.

The individual images of the 0th frame, the 1st frame, and the 2nd frame illustrated in FIG. 6 are three successive image frames configuring the moving image serving as the contents data 121 supplied from the contents data supply unit 103 to the output control signal generation unit 104.

From each image of these three successive images, the output control signal generation unit 104 individually selectively outputs group pixels located at different pixel positions as described above, and outputs the group pixels to the display unit 105. As a result, a display image 230 illustrated in FIG. 6 is output to the display unit 105.

The display image 230 illustrated in FIG. 6 becomes
the n-th line of the 0th frame,
the n+1-th line of the 1st frame,
the n+2-th line of the 2nd frame,
the n+3-th line of the 0th frame,
the n+4-th line of the 1st frame,
the n+5-th line of the 2nd frame, and so on.

As described above, an image where lines are sequentially selected one by one from the upper rows of the three successive image frames and combined.

In addition, when the subsequent third frame is input from the contents data supply unit 103, pixel values corresponding to the 0th frame of the display image 230 illustrated in FIG. 6 are updated to pixel values of the same group of the 3rd frame.

Thereafter, at the time of inputting of the 4th frame, pixel values of the 1st frame illustrated in FIG. 6 are updated by pixels of the 4th frame, and at the time of inputting of the 5th frame, pixel values of the 2nd frame illustrated in FIG. 6 are updated by pixel values of the 5th frame.

In this way, the image output to the display unit 105 becomes an image where constituent pixels of the three successive image frames of a moving image content serving as the contents data 121 are mixed, and update of pixels of individual groups is sequentially executed.

Figure 7:
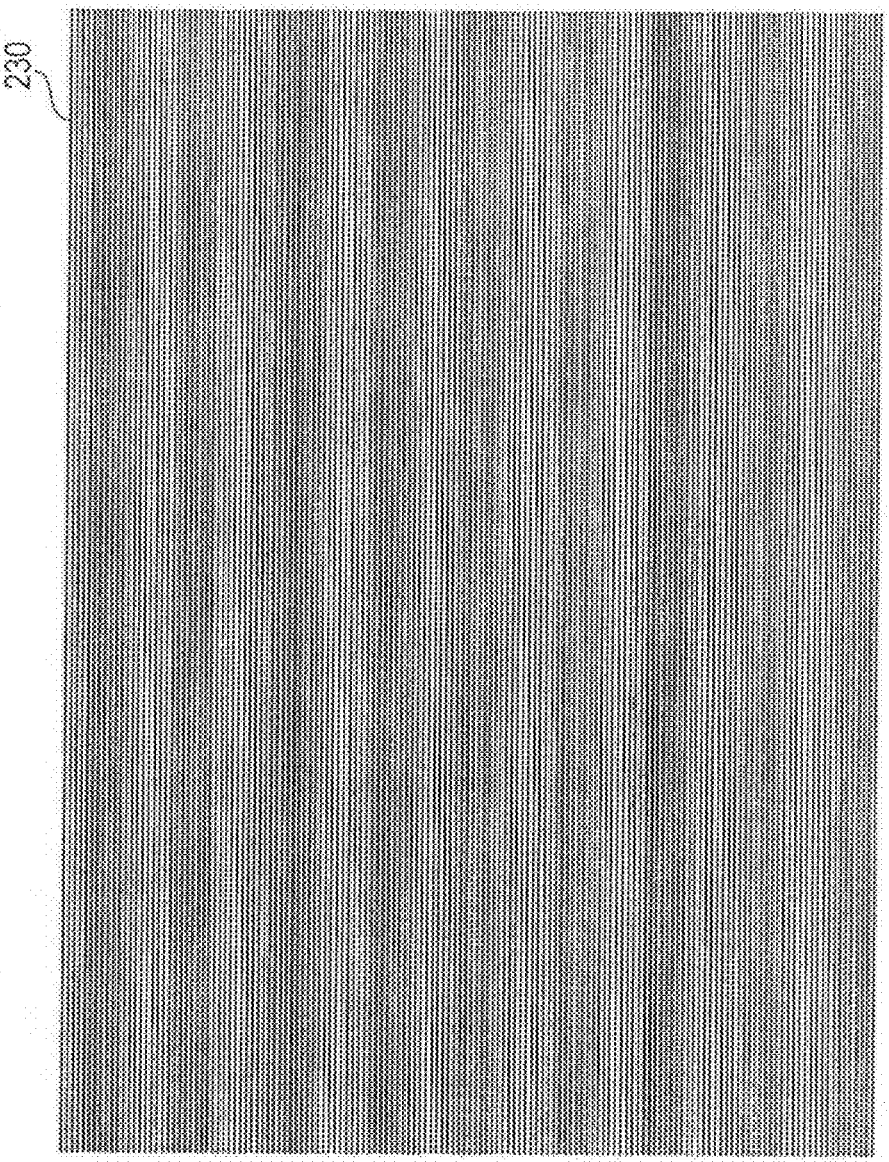
FIG. 7 is a diagram explaining an example of a display image generated in an embodiment of the present disclosure.

In FIG. 7, an example of the display image 230 is illustrated. Compared with an original image, in other words, each of the images of the 0th to 2nd frames illustrated in FIG. 6, the display image 230 illustrated in FIG. 7 becomes an image where the bright and dark stripes are comparatively difficult to perceive.

As flicker reduction processing of the related art, there exists, for example, processing where pixel values of pixels located at the same position in successive imaging frames are averaged and defined as an output pixel value.

The configuration of an embodiment of the present disclosure is processing different from such processing of the related art, and a configuration where pixels located at different positions in successive imaging frames are simply combined and output. Accordingly, arithmetic processing such as average processing for pixel values becomes unnecessary.

In the same way as flicker reduction processing of the related art, it is assumed that pixel values at the same position in three successive imaging frames are averaged to calculate an output pixel value, in a way similar to the processing illustrated in FIG. 6.

If a bright and dark component generated in the 0th to 2nd frames configuring a moving image serving as the original image-capturing content illustrated in FIG. 6 is approximated by a sin curve, the bright and dark component of a pixel within the moving image is expressed by the following (Expression 1).

$$\sin(\theta_0 + L_o \times \theta_d) \quad \text{(Expression 1)}$$

$\theta_0$: a phase of a screen upper end
$L_o$: the number of lines from the screen upper end of a relevant pixel in a display moving image
$\theta_d$: a phase advancing per one line In a case where a moving image of 60 fps is captured under a light source blinking with 100 Hz, the phase of the sin curve at the screen upper end advances by 240 degrees (=(4/3)π) every frame. Therefore, the brightness of each line after addition is expressed by the following (Expression 2), the brightness of each line becomes equal, and the bright and dark component disappears.

$$\sin(\theta_0 + L_o \times \theta_d) + \sin(\theta_0 + L_o \times \theta_d + (4/3)\pi) + \sin(\theta_0 + L_o \times \theta_d + (2/3)\pi) \quad \text{(Expression 2)}$$

In this way, in the processing of the related art, pixel values at the same position are extracted throughout a plurality of frames, and pixel value averaging is executed to perform flicker reduction, in accordance with the above-mentioned calculation formula.

The processing of an embodiment of the present disclosure is not pixel value averaging for the same position in a plurality of successive imaging frames, and is processing where pixel values of a plurality of successive imaging frames are mixed in a spatial direction without change.

In other words, pixels located at different positions of a plurality of successively captured images are combined to generate one output image. By mixing individual pixels of successively captured images in the spatial direction, an effect similar to the above-mentioned (Expression 2) is generated to reduce the bright and dark stripes serving as the flicker component. In addition, in the configuration to which the processing of an embodiment of the present disclosure is applied, the bright and dark component becomes difficult to perceive with an increase in the number of lines of a display device.

5. About Other Embodiments

In the above-mentioned embodiment, an example of processing has been described where the number n of groups=3 is adopted, individual groups, in other words, individual groups 0 to 2, are set so as to be sequentially repeated by one line from the upper row of an image, and pixels individually belonging to different groups are selected, as output pixels, from the three successively captured images.

Hereinafter, embodiments different from the above-mentioned embodiment will be described.

5-1. Example where Group Setting is Set to Random Pattern

Second Embodiment

As a second embodiment, an example will be described where the number n of groups=3 is adopted in the same way as in the above-mentioned embodiment and the setting positions of groups are set to a random pattern.

In the above-mentioned first embodiment, in the groups, by one row from the upper row of an image frame, the following different groups are sequentially set:

the group 0,
the group 1, and
the group 2,
the repetition of the groups 0 to 2 in units of rows is set up to the lower row, and a group setting is performed.

In the second embodiment described below, the number n of groups=3 is adopted in the same way as in the above-mentioned embodiment. In this regard, however, as for the groups, a repetitive setting by one row is not adopted, and such a random setting as, for example, illustrated in FIG. 8 is adopted.

Figure 8:
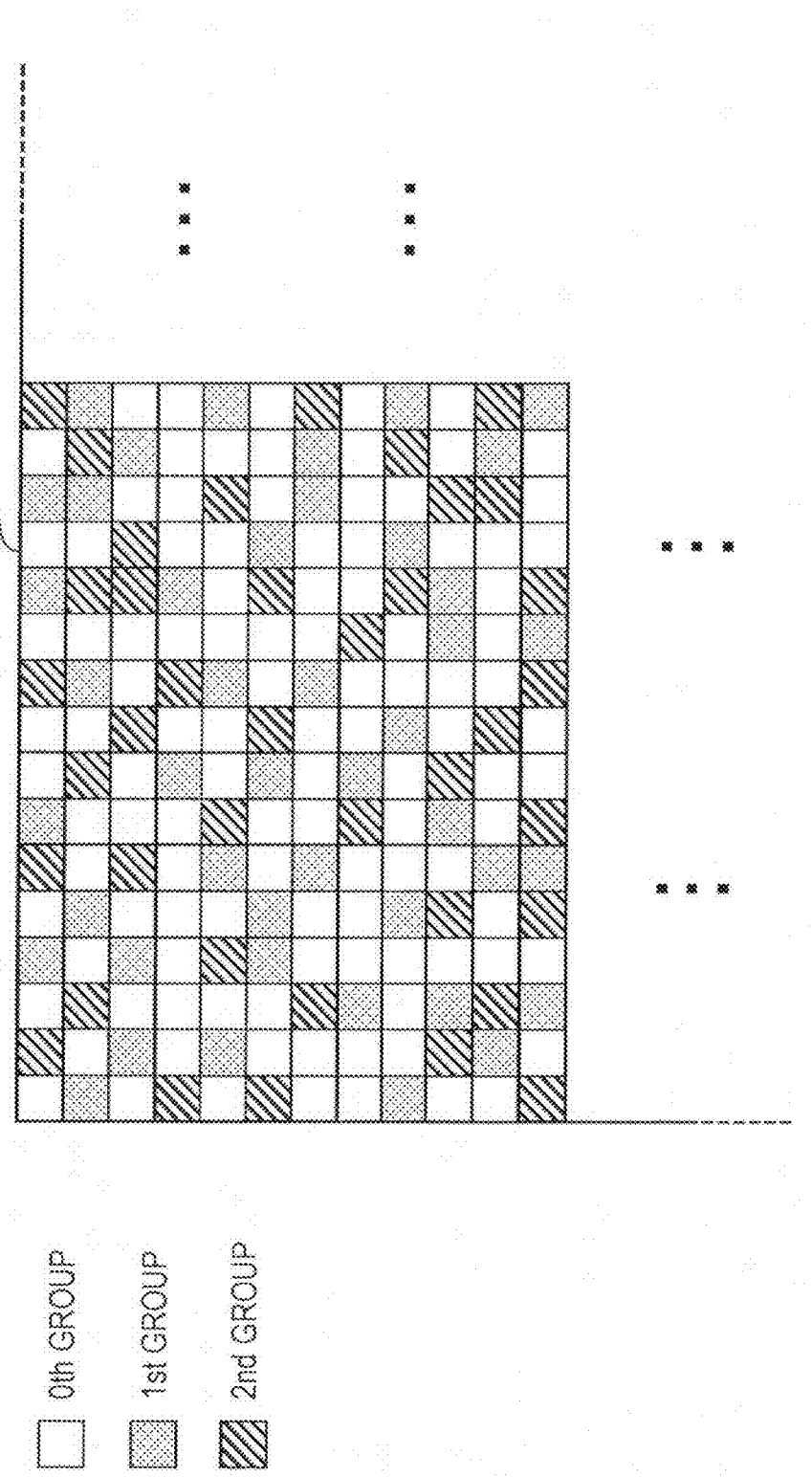
FIG. 8 is a diagram explaining an example of a group setting where the group setting is set to a random pattern.

FIG. 8 is a diagram illustrating an example of a group setting according to the second embodiment.

In FIG. 8, a portion of one image frame 240 configuring the contents data 121 serving as a moving image is illustrated.

In the present embodiment, in units of, for example, pixels, the constituent pixels of the image frame 240 are not set to a regular pattern but randomly set to one of the 0th group to the 2nd group.

In addition, while a setting for re-selecting a random pattern every image frame may be adopted, the setting is costly. Therefore, one random pattern may be preliminarily specified, and a setting where the one specified random pattern is utilized and applied to each image frame may be adopted.

For example, specifically, the to-be-updated pixel selection unit 102 illustrated in FIG. 3 holds, in the memory, one random pattern of such a setting as illustrated in FIG. 8, as one piece of the group division information.

In accordance with the random pattern acquired from the memory, the to-be-updated pixel selection unit 102 generates and outputs, to the output control signal generation unit 104, the to-be-updated pixel information 123 indicating to-be-updated pixel positions to be set in response to each image frame.

In accordance with the to-be-updated pixel information 123 supplied from the to-be-updated pixel selection unit 102, the output control signal generation unit 104 selects pixels located at the to-be-updated pixel positions, from each image frame of the contents data 121 supplied from the contents data supply unit 103, and generates and outputs, to the display unit 105, the output control signal 124 for only updating the pixel values of the selected pixels.

Specific processing the output control signal generation unit 104 executes will be described.

First, as the contents data 121 output from the contents data supply unit 103, the 0th frame of moving image data is input.

The output control signal generation unit 104 selects, as to-be-updated pixels, pixels corresponding to the 0th group of the 0th frame, and generates and outputs, to the display unit 105, the output control signal 124 causing processing to be executed, the processing being used for only updating, with pixel values of the 0th group of the 0th frame, pixel values of a pixel region corresponding to the 0th group within the output image of the display unit 105.

In accordance with the output control signal 124 input from the output control signal generation unit 104, the display unit 105 only updates some pixels within the display image of the display unit 105. In other words, using the pixel values of pixels corresponding to the 0th group of the 0th frame, the pixel values of some pixels in the display image are updated.

Next, the output control signal generation unit 104 inputs, as the contents data 121, the 1st frame of the moving image data from the contents data supply unit 103.

The output control signal generation unit 104 selects, as to-be-updated pixels, pixels corresponding to the 1st group of the 1st frame, and generates and outputs, to the display unit 105, the output control signal 124 causing processing to be executed, the processing being used for only updating, with pixel values of the 1st group of the 1st frame, pixel values of a pixel region corresponding to the 1st group within the output image of the display unit 105.

In accordance with the output control signal 124 input from the output control signal generation unit 104, the display unit 105 only updates some pixels within the display image of the display unit 105. In other words, using the pixel values of pixels corresponding to the 1st group of the 1st frame, the pixel values of some pixels in the display image are updated.

Next, the output control signal generation unit 104 inputs, as the contents data 121, the 2nd frame of the moving image data from the contents data supply unit 103.

The output control signal generation unit 104 selects, as to-be-updated pixels, pixels corresponding to the 2nd group of the 2nd frame, and generates and outputs, to the display unit 105, the output control signal 124 causing processing to be executed, the processing being used for only updating, with pixel values of the 2nd group of the 2nd frame, pixel values of a pixel region corresponding to the 2nd group within the output image of the display unit 105.

In accordance with the output control signal 124 input from the output control signal generation unit 104, the display unit 105 only updates some pixels within the display image of the display unit 105. In other words, using the pixel values of pixels corresponding to the 2nd group of the 2nd frame, the pixel values of some pixels in the display image are updated.

In this way, from each of the three successive frames of the moving image data serving as the contents data 121 supplied from the contents data supply unit 103, the output control signal generation unit 104 sequentially selects only pixel data of a specific group, and outputs, to the display unit 105, the output control signal 124 for causing the pixel values of the selected group to be updated.

By means of the processing, in the display image of the display unit 105, pixels of three groups are sequentially updated and displayed. In addition, in a case where the contents data 121 supplied from the contents data supply unit 103 is, for example, a moving image of 60 fps having 60 frames per second, pixels of one group are updated every ($1/60$) seconds in the image displayed on the display unit 105. In other words, in the present example, pixels of a region of one third of the display image are updated every ($1/60$) seconds, and the entire image is updated in units of $3\times(1/60)=(1/20)$ seconds.

In the present embodiment, in the same way as in the first embodiment described above, the image displayed on the display unit 105 is sequentially updated by a region of one third of the entire display image. Since this update processing is rapidly executed, a difference with usual moving image display updated in units of frames is not recognized by the human eye, and the image displayed on the display unit 105 is observable as the same image as general display of a moving image.

The image displayed on the display unit 105 by this processing becomes an image where bright and dark stripes serving as a flicker component are reduced.

Figure 9:
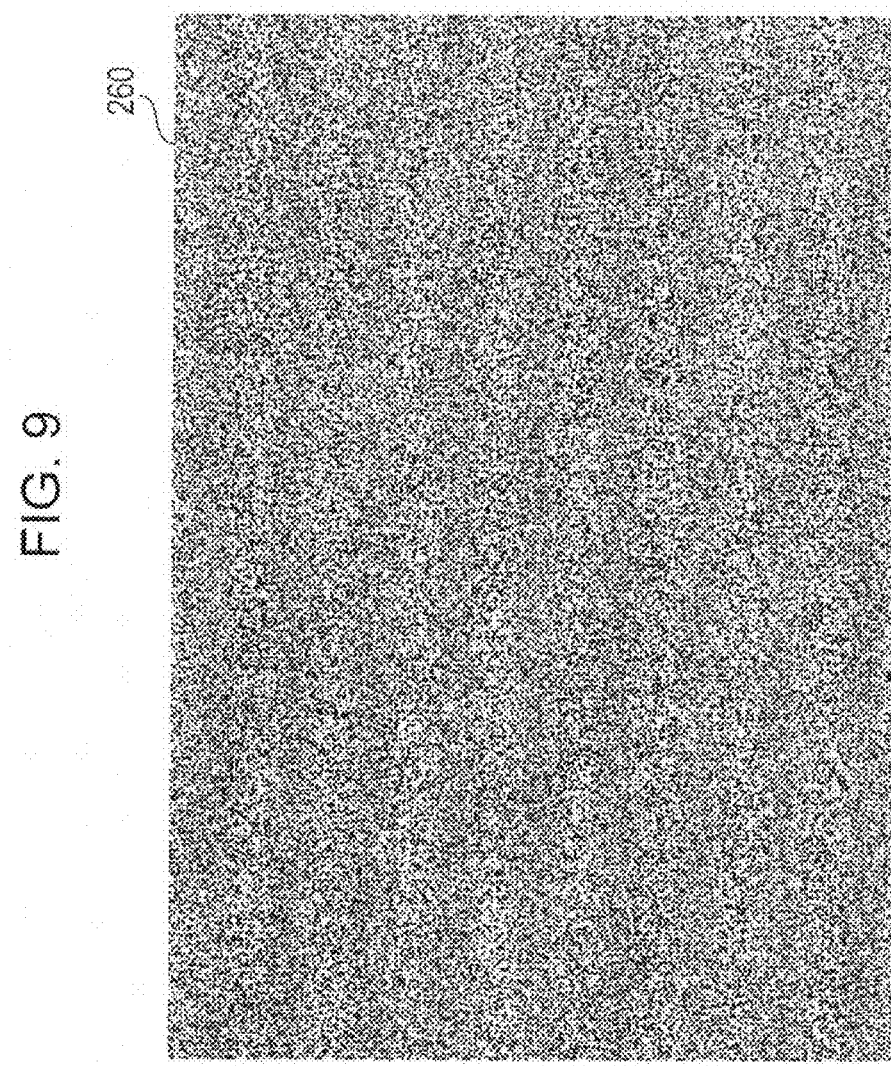
FIG. 9 is a diagram explaining an example of an image displayed, on the display unit, based on an output control signal the output control signal generation unit generates in accordance with the group setting set to the random pattern.

FIG. 9 illustrates an image 260 displayed on the display unit 105 by the above-mentioned processing.

The image 260 displayed on the display unit 105 becomes an image where the constituent pixels of three successive image frames are mixed.

Compared with an original image, in other words, each image frame configuring the contents data 121 supplied from the contents data supply unit 103 illustrated in FIG. 3, namely, each of the images of the 0th to 2nd frames illustrated in FIG. 6 and described in the former first embodiment, the display image 260 illustrated in FIG. 9 becomes an image where the bright and dark stripes are comparatively difficult to perceive.

In the same way as in the former first embodiment, the second embodiment adopts a configuration where pixels located at different positions in successive imaging frames are combined and output. Accordingly, arithmetic processing such as average processing for pixel values becomes unnecessary.

In addition, in the processing of the second embodiment, pixel update is not performed in units of rows in the same way as in the first embodiment, and update positions have randomness. Therefore, in the image 260 illustrated in FIG. 9, bright and dark stripes disappear that are perceivable in the display image of the first embodiment, in other words, the image 230 illustrated in FIG. 7, and a reduction effect for bright and dark stripes due to a flicker is further improved.

In addition, since the image 260 illustrated in FIG. 9 is one output image configuring the moving image, it is possible to confirm a slightly bright and dark component in the random pattern. However, in a case of displaying a moving image, the pixel updates of random positions are successively executed. Therefore, bright and dark stripes visible in the image 260 illustrated in FIG. 9 becomes more difficult to view from the moving image.

5-2. Example where Number of Groups is Changed in Accordance with Cyclic Period of Flicker

Third Embodiment

Next, as a third embodiment, an embodiment where the number of groups is changed in accordance with a cyclic period of a flicker will be described.

It is assumed that image capturing is performed under the following condition:
  a frame rate of a captured image=50 fps, and
  a power-supply frequency of an image-capturing environment=60 Hz.

In the above-mentioned condition, an imaging period of each frame is 1/50 sec, and a blinking frequency of a fluorescent light is 1/120 sec.

Since the least common multiple of the two periods is 1/10 sec, the cyclic period becomes (1/10)÷(1/50)=5 frames.

In the present embodiment, the number n of groups is set to a number coinciding with the cyclic period.

The number of groups equal to the cyclic period=5 frames calculated in accordance with the above-mentioned condition, in other words, the number of groups=5 is adopted, and a setting where all pixels are divided into 5 groups is adopted.

While, as for the form of group division, various settings such as a setting where group division is performed in units of rows in the same way as in the first embodiment and a setting where group division is randomly performed in the same way as in the second embodiment are available, here an example of a case where group setting is performed in units of rows in the same way as in the first embodiment will be described.

The cyclic period determination unit 101 in the image processing device 100 illustrated in FIG. 3 judges a cyclic period, based on the contents data 121 supplied from the contents data supply unit 103.

The cyclic period judged here is 5.

The cyclic period determination unit outputs the cyclic period information 122 including information of the cyclic period=5, to the to-be-updated pixel selection unit 102.

In accordance with the cyclic period information 122 including the information of the cyclic period=5, the to-be-updated pixel selection unit 102 selects group division information of the number of groups=5 from the group division information stored in the memory.

This group division information is, for example, group division information for classifying the 0th line serving as the uppermost row of an image frame to the Lmax-th line serving as the lowermost row thereof into five groups of the 0th group to the 4th group in units of rows.

In other words, as for each image frame, the uppermost row (the 0th line) to the lowermost row (the Lmax-th line) are subjected to group division in the following way. In this regard, however, m=an integer number greater than or equal to 0 is satisfied:
  the 5×m-th line=the 0th group,
  the 5×m+1-th line=the 1st group,
  the 5×m+2-th line=the 2nd group,
  the 5×m+3-th line=the 3rd group, and
  the 5×m+4-th line=the 4th group.

In accordance with the group division information of the number of groups=5, stored in the memory, the to-be-updated pixel selection unit 102 performs such group division.

In addition, the group division information indicating what form groups are set in is stored in a memory accessible by the to-be-updated pixel selection unit 102. The to-be-updated pixel selection unit 102 selects, from the memory, group division information having the number of groups serving as the integral multiple of the cyclic period of the contents data 121, in accordance with the cyclic period information 122 generated by the cyclic period determination unit 101, and decides the group setting of each image in accordance with the selected group division information.

In the present embodiment, it is assumed that, in accordance with the group division information selected and acquired from the memory, five groups are set in units of rows.

With respect to each image frame configuring the contents data 121 input from the contents data supply unit 103, the output control signal generation unit 104 generates and outputs, to the display unit 105, the output control signal 124 for updating pixels of the display image of the display unit 105 in accordance with the to-be-updated pixel information the to-be-updated pixel selection unit 102 generates.

In accordance with, for example, the above-mentioned group setting in units of rows, pixels of a specific group is selected, as to-be-updated pixels, from each image frame configuring the contents data 121 supplied from the contents data supply unit 103, and update of display pixels of the display unit 105 is executed in units of groups.

Specific processing the output control signal generation unit 104 executes will be described.

First, as the contents data 121 output from the contents data supply unit 103, the 0th frame of moving image data is input. The output control signal generation unit 104 selects, as to-be-updated pixels, pixels corresponding to the 0th group of the 0th frame, and generates and outputs, to the display unit 105, the output control signal 124 causing processing to be executed, the processing being used for only updating, with pixel values of the 0th group of the 0th frame, pixel values of a pixel region corresponding to the 0th group within the output image of the display unit 105.

In accordance with the output control signal 124 input from the output control signal generation unit 104, the display unit 105 only updates some pixels within the display image of the display unit 105. In other words, using the pixel values of pixels corresponding to the 0th group of the 0th frame, the pixel values of some pixels in the display image are updated.

Next, the output control signal generation unit 104 inputs, as the contents data 121, the 1st frame of the moving image data from the contents data supply unit 103.

The output control signal generation unit 104 selects, as to-be-updated pixels, pixels corresponding to the 1st group of the 1st frame, and generates and outputs, to the display unit 105, the output control signal 124 causing processing to be executed, the processing being used for only updating, with pixel values of the 1st group of the 1st frame, pixel values of a pixel region corresponding to the 1st group within the output image of the display unit 105.

In accordance with the output control signal 124 input from the output control signal generation unit 104, the display unit 105 only updates some pixels within the display image of the display unit 105. In other words, using the pixel values of pixels corresponding to the 1st group of the 1st frame, the pixel values of some pixels in the display image are updated.

Next, the output control signal generation unit 104 inputs, as the contents data 121, the 2nd frame of the moving image data from the contents data supply unit 103.

The output control signal generation unit 104 selects, as to-be-updated pixels, pixels corresponding to the 2nd group of the 2nd frame, and generates and outputs, to the display unit 105, the output control signal 124 causing processing to be executed, the processing being used for only updating, with pixel values of the 2nd group of the 2nd frame, pixel values of a pixel region corresponding to the 2nd group within the output image of the display unit 105.

In accordance with the output control signal 124 input from the output control signal generation unit 104, the display unit 105 only updates some pixels within the display image of the display unit 105. In other words, using the pixel values of pixels corresponding to the 2nd group of the 2nd frame, the pixel values of some pixels in the display image are updated.

Next, the output control signal generation unit 104 inputs, as the contents data 121, the 3rd frame of the moving image data from the contents data supply unit 103.

The output control signal generation unit 104 selects, as to-be-updated pixels, pixels corresponding to the 3rd group of the 3rd frame, and generates and outputs, to the display unit 105, the output control signal 124 causing processing to be executed, the processing being used for only updating, with pixel values of the 3rd group of the 3rd frame, pixel values of a pixel region corresponding to the 3rd group within the output image of the display unit 105.

In accordance with the output control signal 124 input from the output control signal generation unit 104, the display unit 105 only updates some pixels within the display image of the display unit 105. In other words, using the pixel values of pixels corresponding to the 3rd group of the 3rd frame, the pixel values of some pixels in the display image are updated.

Next, the output control signal generation unit 104 inputs, as the contents data 121, the 4th frame of the moving image data from the contents data supply unit 103.

The output control signal generation unit 104 selects, as to-be-updated pixels, pixels corresponding to the 4th group of the 4th frame, and generates and outputs, to the display unit 105, the output control signal 124 causing processing to be executed, the processing being used for only updating, with pixel values of the 4th group of the 4th frame, pixel values of a pixel region corresponding to the 4th group within the output image of the display unit 105.

In accordance with the output control signal 124 input from the output control signal generation unit 104, the display unit 105 only updates some pixels within the display image of the display unit 105. In other words, using the pixel values of pixels corresponding to the 4th group of the 4th frame, the pixel values of some pixels in the display image are updated.

In this way, from each of the five successive frames of the moving image data serving as the contents data 121 supplied from the contents data supply unit 103, the output control signal generation unit 104 sequentially selects only pixel data of a specific group, and outputs, as the output control signal 124, the selected group data to the display unit 105.

By means of the processing, in the display image of the display unit 105, pixels of five groups are sequentially updated and displayed. In addition, in a case where the contents data 121 supplied from the contents data supply unit 103 is, for example, a moving image of 50 fps having 50 frames per second, pixels of one group are updated every ($\frac{1}{50}$) seconds in the image displayed on the display unit 105. In other words, in the present example, pixels of a region of one fifth of the display image are updated every ($\frac{1}{50}$) seconds, and the entire image is updated in units of $5 \times (\frac{1}{50}) = (\frac{1}{10})$ seconds.

In the configuration of an embodiment of the present disclosure, the image displayed on the display unit 105 is sequentially updated by a region of one fifth of the entire display image. However, since this update processing is rapidly executed, a difference with usual moving image display updated in units of frames is not recognized by the human eye, and the image displayed on the display unit 105 is observable as the same image as general display of a moving image.

The image displayed on the display unit 105 by the processing becomes an image where bright and dark stripes serving as a flicker component are reduced.

Figure 10:
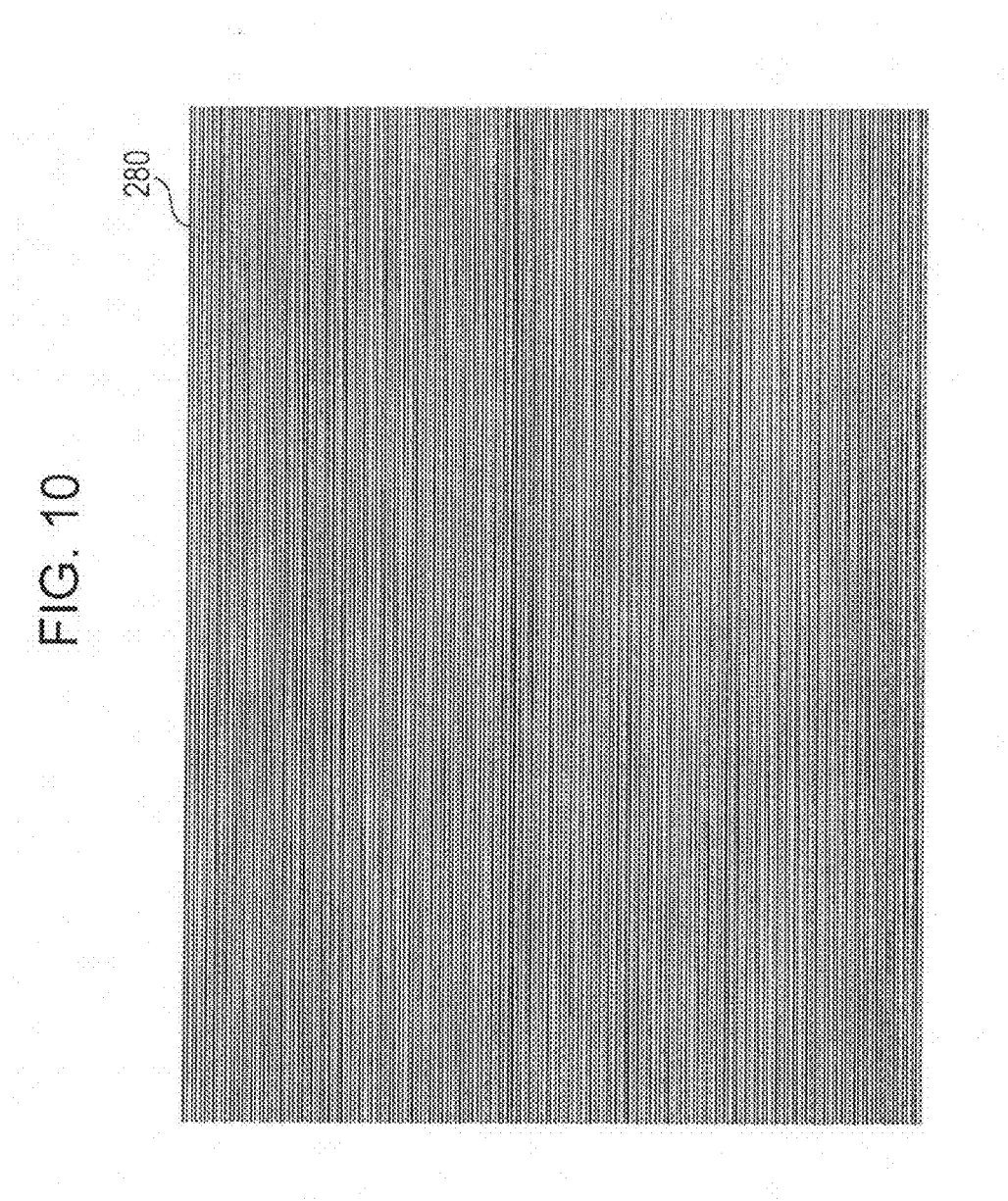
FIG. 10 is a diagram explaining an example of an image displayed, on the display unit, based on an output control signal the output control signal generation unit generates in accordance with the group setting where the number of groups is set to 5.

FIG. 10 illustrates an example of an image 280 displayed on the display unit 105 by the above-mentioned processing.

The image displayed on the display unit 105 becomes an image where the constituent pixels of five successive image frames are mixed.

Compared with an original image, such as, for example, each image frame configuring the contents data 121 supplied from the contents data supply unit 103 illustrated in FIG. 3, namely, each of the images of the 0th to 2nd frames illustrated in FIG. 6, the display image 280 illustrated in FIG. 10 becomes an image where the bright and dark stripes are comparatively difficult to perceive.

In the same way as in the former first or second embodiment, the third embodiment adopts a configuration where pixels located at different positions in successive imaging frames are combined and output. Accordingly, arithmetic processing such as average processing for pixel values becomes unnecessary.

As described above, in the processing of an embodiment of the present disclosure, using only processing where pixels of some groups are selected in units of individual image frames configuring a moving image and the selected pixels are sequentially updated, it is possible to reduce bright and dark stripes serving as a flicker included in a display content. In other words, in the processing of an embodiment of the present disclosure, it is not necessary to perform averaging or the like of pixel values, executed as flicker reduction processing of the related art, and a circuit performing image signal processing for this arithmetic operation becomes unnecessary.

In addition, the above-mentioned processing of an embodiment of the present disclosure and flicker reduction processing based on image signal processing of the related art may be combined and executed. Processing for removing a bright and dark stripe component using the image signal processing of the related art is executed, and after that, the processing of an embodiment of the present disclosure is further executed.

Even in a case where it is difficult to sufficiently remove a flicker component using, for example, signal processing of the related art, execution of the combination of such a plurality of processing operations enables the flicker component to be further reduced by applying a method of an embodiment of the present disclosure.

6. Summary of Configuration of Embodiment of Present Disclosure

As above, the configuration of an embodiment of the present disclosure has been described in detail with reference to specific embodiments. However, it is obvious that those skilled in the art may modify or substitute the embodiments without departing from the scope of an embodiment of the present disclosure. In other words, an embodiment of the present technology has been disclosed in the form of exemplification, and is not interpreted to a limited extent. So as to determine the scope of an embodiment of the present technology, the appended Claims should be considered.

In addition, an embodiment of the technology disclosed in the present specification may adopt the following configurations.

(1) An image processing device including
a to-be-updated pixel selection unit configured to execute processing for deciding, in response to a cyclic period serving as a frame period of a bright and dark stripe pattern of image frames configuring a moving image content, a group division form of constituent pixels of the image frames and dividing the constituent pixels of the image frames into a plurality of groups in accordance with the decided group division form, and
  generate, from each of the image frames, to-be-updated pixel information setting pixels of a specific group as to-be-updated pixels, and
an output control signal generation unit configured to selectively output, in accordance with the to-be-updated pixel information, to-be-updated pixels belonging to a specific group from each of the image frames and generate an output control signal for causing pixels of a display image to be updated in units of groups.

(2) The image processing device according to the above-mentioned (1), further including a cyclic period determination unit configured to determine the cyclic period of the moving image content and generate cyclic period information serving as a determination result, wherein the to-be-updated pixel selection unit applies the cyclic period information and decides the group division form.

(3) The image processing device according to any one of the above-mentioned (1) and (2), further including a display unit configured to input the output control signal from the output control signal generation unit and update, in accordance with the input output control signal, constituent pixels of the display image in units of groups.

(4) The image processing device according to any one of the above-mentioned (1) to (3), wherein, in group division processing for the constituent pixels of the image frames, the to-be-updated pixel selection unit executes group division processing set to the number of groups of the integral multiple of the cyclic period.

(5) The image processing device according to any one of the above-mentioned (1) to (4), wherein the to-be-updated pixel selection unit executes group division processing for the constituent pixels of the image frames by applying group division information stored in a memory.

(6) The image processing device according to any one of the above-mentioned (1) to (5), wherein, in a case of the number of set groups=n, the to-be-updated pixel selection unit executes group division processing for repeatedly setting constituent rows of the image frames to groups 1 to n by one row, and generates the to-be-updated pixel information where specific group pixels divided from each image frame in units of rows are set as to-be-updated pixels, and the output control signal generation unit selectively outputs row-group-based to-be-updated pixels belonging to the specific group from each of the image frames, and generates the output control signal for causing the pixels of the display image to be updated in units of row groups.

(7) The image processing device according to any one of the above-mentioned (1) to (5), wherein the to-be-updated pixel selection unit executes group division processing for dividing the constituent pixels of the image frames into a plurality of groups in accordance with a random pattern, and generates the to-be-updated pixel information where specific group pixels divided from each image frame in accordance with the random pattern are set as to-be-updated pixels, and the output control signal generation unit selectively outputs to-be-updated pixels belonging to the specific group from each of the image frames, and generates the output control signal for causing the pixels of the display image to be updated in accordance with the random pattern.

(8) The image processing device according to any one of the above-mentioned (1) to (7), wherein the to-be-updated pixel selection unit stores, in a memory, a plurality of pieces of group division information specifying group division forms, acquires, from the memory, group division information set to the number of groups of the integral multiple of the cyclic period, and executes group division processing in accordance with the acquired group division information.

(9) An imaging device including
an imaging unit configured to image-capture a moving image content,
a to-be-updated pixel selection unit configured to execute processing for inputting an image-captured moving image content from the imaging unit, deciding, in response to a cyclic period serving as a frame period of a bright and dark stripe pattern of image frames configuring the input moving image content, a group division form of constituent pixels of the image frames, and dividing the constituent pixels of the image frames into a plurality of groups in accordance with the decided group division form, and
  generate, from each of the image frames, to-be-updated pixel information setting pixels of a specific group as to-be-updated pixels, and
an output control signal generation unit configured to selectively output, in accordance with the to-be-updated pixel information, to-be-updated pixels belonging to a specific group from each of the image frames and generate an output control signal for causing pixels of a display image to be updated in units of groups.

(10) The imaging device according to the above-mentioned (9), further including a cyclic period determination unit configured to determine the cyclic period of the moving image content and generate cyclic period information serving as a determination result, wherein the to-be-updated pixel selection unit applies the cyclic period information and decides the group division form.

(11) The imaging device according to any one of the above-mentioned (9) and (10), further including a display unit configured to input the output control signal from the output control signal generation unit and update, in accordance with the input output control signal, constituent pixels of the display image in units of groups.

(12) An image processing method executed in an image processing device, the image processing method including
a to-be-updated pixel selection unit deciding, in response to a cyclic period serving as a frame period of a bright and dark stripe pattern of image frames configuring a moving image content, a group division form of constituent pixels of the image frames, dividing the constituent pixels of the image frames into a plurality of groups in accordance with the decided group division form, and generating, from each of the image frames, to-be-updated pixel information setting pixels of a specific group as to-be-updated pixels, and
an output control signal generation unit selectively outputting, in accordance with the to-be-updated pixel information, to-be-updated pixels belonging to a specific group from each of the image frames, and generating an output control signal for causing pixels of a display image to be updated in units of groups.

(13) A program causing image processing to be executed in an image processing device, the program including
causing a to-be-updated pixel selection unit to execute processing for deciding, in response to a cyclic period serving as a frame period of a bright and dark stripe pattern of image frames configuring a moving image content, a group division form of constituent pixels of the image frames and dividing the constituent pixels of the image frames into a plurality of groups in accordance with the decided group division form, and
to execute processing for generating, from each of the image frames, to-be-updated pixel information setting pixels of a specific group as to-be-updated pixels, and
causing an output control signal generation unit to selectively output, in accordance with the to-be-updated pixel information, to-be-updated pixels belonging to a specific group from each of the image frames and generate an output control signal for causing pixels of a display image to be updated in units of groups.

In addition, a series of processing operations described in the specification may be executed by hardware, software, or the composite configuration of both thereof. In a case of executing processing based on software, a program recording therein a processing sequence is installed into a memory within a computer incorporated into dedicated hardware and caused to execute the processing, or alternatively, the program may be installed into a general-purpose computer capable of executing various kinds of processing operations and caused to execute the processing. The program may be preliminarily recorded in, for example, a recording medium. In addition to being installed from a recording medium into a computer, a program may be received through a network such as a local area network (LAN) or Internet and installed into a recording medium such as an embedded hard disk.

In addition, various kinds of processing operations described in the specification are able to be executed not only in chronological order in accordance with the description but also parallelly or individually in accordance with the processing capacity of a device executing the processing operations or as necessary. In addition, in the present specification, the term "system" refers to a configuration that logically aggregates a plurality of devices, and is not limited to a configuration where devices of individual configurations are located within the same chassis.

What is claimed is:

1. An image processing device comprising:
circuitry configured to
execute processing for deciding, in response to a cyclic period serving as a frame period of a bright and dark stripe pattern of image frames configuring a moving image content, a group division form of constituent pixels of the image frames;
divide the constituent pixels of the image frames into a plurality of groups in accordance with the decided group division form;
generate, from each of the image frames, to-be-updated pixel information setting pixels of a specific group as to-be-updated pixels;
selectively output, in accordance with the to-be-updated pixel information, to-be-updated pixels belonging to a specific group from each of the image frames; and
generate an output control signal for causing pixels of a display image to be updated in units of groups.

2. The image processing device of claim 1, wherein the circuitry is configured to
determine the cyclic period of the moving image content and generate cyclic period information serving as a determination result; and,
apply the cyclic period information and decide the group division form.

3. The image processing device of claim 1, wherein
the circuitry is configured to update constituent pixels of the display image in units of groups in accordance with the output control signal.

4. The image processing device of claim 1, wherein
the circuitry is configured to execute group division processing set to the number of groups of the integral multiple of the cyclic period, in group division processing for the constituent pixels of the image frames.

5. The image processing device of claim 1, wherein
the circuitry is configured to execute group division processing for the constituent pixels of the image frames by applying group division information stored in a memory.

6. The image processing device of claim 1, wherein the circuitry is configured to
in a case of the number of set groups=n, execute group division processing for repeatedly setting constituent rows of the image frames to groups 1 to n by one row;
generate the to-be-updated pixel information where specific group pixels divided from each image frame in units of rows are set as to-be-updated pixels;
selectively output row-group-based to-be-updated pixels belonging to the specific group from each of the image frames; and
generate the output control signal for causing the pixels of the display image to be updated in units of row groups.

7. The image processing device of claim 1, wherein the circuitry is configured to
execute group division processing for dividing the constituent pixels of the image frames into a plurality of groups in accordance with a random pattern;

generate the to-be-updated pixel information where specific group pixels divided from each image frame in accordance with the random pattern are set as to-be-updated pixels;

selectively output to-be-updated pixels belonging to the specific group from each of the image frames; and generate the output control signal for causing the pixels of the display image to be updated in accordance with the random pattern.

8. The image processing device of claim 1, wherein the circuitry is configured to store, in a memory, a plurality of pieces of group division information specifying group division forms;

acquire, from the memory, group division information set to the number of groups of the integral multiple of the cyclic period; and execute group division processing in accordance with the acquired group division information.

9. An imaging device comprising:

a camera configured to image-capture a moving image content; and circuitry configured to execute processing for inputting an image-captured moving image content from the camera;

decide, in response to a cyclic period serving as a frame period of a bright and dark stripe pattern of image frames configuring the input moving image content, a group division form of constituent pixels of the image frames;

divide the constituent pixels of the image frames into a plurality of groups in accordance with the decided group division form;

generate, from each of the image frames, to-be-updated pixel information setting pixels of a specific group as to-be-updated pixels;

to selectively output, in accordance with the to-be-updated pixel information, to-be-updated pixels belonging to a specific group from each of the image frames; and generate an output control signal for causing pixels of a display image to be updated in units of groups.

10. The imaging device of claim 9, wherein the circuitry is configured to determine the cyclic period of the moving image content and generate cyclic period information serving as a determination result; and apply the cyclic period information and decide the group division form.

11. The imaging device of claim 9, wherein the circuitry is configured to update, constituent pixels of the display image in units of groups in accordance with the output control signal.

12. An image processing method executed in an image processing device, the image processing method comprising:

deciding, in response to a cyclic period serving as a frame period of a bright and dark stripe pattern of image frames configuring a moving image content, a group division form of constituent pixels of the image frames;

dividing the constituent pixels of the image frames into a plurality of groups in accordance with the decided group division form;

generating, from each of the image frames, to-be-updated pixel information setting pixels of a specific group as to-be-updated pixels;

selectively outputting, in accordance with the to-be-updated pixel information, to-be-updated pixels belonging to a specific group from each of the image frames; and generating an output control signal for causing pixels of a display image to be updated in units of groups.

13. A non-transitory computer-readable medium including computer program instructions, which when executed by an image processing device, cause the image processing device to:

execute processing for deciding, in response to a cyclic period serving as a frame period of a bright and dark stripe pattern of image frames configuring a moving image content, a group division form of constituent pixels of the image frames;

divide the constituent pixels of the image frames into a plurality of groups in accordance with the decided group division form;

generate, from each of the image frames, to-be-updated pixel information setting pixels of a specific group as to-be-updated pixels;

selectively output, in accordance with the to-be-updated pixel information, to-be-updated pixels belonging to a specific group from each of the image frames; and generate an output control signal for causing pixels of a display image to be updated in units of groups.

* * * * *